(12) United States Patent
Sinha et al.

(10) Patent No.: US 10,783,549 B2
(45) Date of Patent: Sep. 22, 2020

(54) DETERMINING PERSUASIVENESS OF USER-AUTHORED DIGITAL CONTENT ITEMS

(71) Applicant: Adobe Inc., San Jose, CA (US)

(72) Inventors: Moumita Sinha, Bangalore (IN); Varun Gupta, Uttar Pradesh (IN); Tathagata Sengupta, Jamshedpur (IN); Niloy Ganguly, West Bengal (IN); Faran Ahmad, New Delhi (IN)

(73) Assignee: ADOBE INC., San Jose, CA (US)

( * ) Notice: Subject to any disclaimer, the term of this patent is extended or adjusted under 35 U.S.C. 154(b) by 456 days.

(21) Appl. No.: 15/355,673

(22) Filed: Nov. 18, 2016

(65) Prior Publication Data

US 2018/0143986 A1    May 24, 2018

(51) Int. Cl.
*G06Q 30/02*    (2012.01)

(52) U.S. Cl.
CPC ................. *G06Q 30/0242* (2013.01)

(58) Field of Classification Search
CPC .............................................. G06Q 300/0242
See application file for complete search history.

(56) References Cited

U.S. PATENT DOCUMENTS

| | | | | |
|---|---|---|---|---|
| 8,676,638 | B1* | 3/2014 | Blair | G06Q 90/00 705/14.1 |
| 9,501,481 | B2* | 11/2016 | Weening | G06F 16/435 |
| 10,013,601 | B2* | 7/2018 | Ebersman | G06F 3/011 |
| 2008/0097854 | A1* | 4/2008 | Young | G06Q 30/0242 705/14.43 |
| 2012/0117339 | A1* | 5/2012 | Kandekar | H04L 67/10 711/159 |
| 2012/0130800 | A1* | 5/2012 | Pradeep | G06Q 30/02 705/14.41 |
| 2015/0100587 | A1* | 4/2015 | Walkingshaw | G06F 16/954 707/748 |
| 2015/0149261 | A1* | 5/2015 | Walkingshaw | G06Q 10/06395 705/7.41 |
| 2015/0186932 | A1* | 7/2015 | Xu | G06Q 30/0251 705/14.66 |
| 2015/0220774 | A1* | 8/2015 | Ebersman | G06F 3/0482 382/118 |
| 2015/0222586 | A1* | 8/2015 | Ebersman | G06F 3/04817 715/752 |

(Continued)

OTHER PUBLICATIONS

Image-based memes as sentiment predictors, IEEE, Jean H. French (Year: 2017).*

(Continued)

*Primary Examiner* — Jean M Corrielus
(74) *Attorney, Agent, or Firm* — Keller Jolley Preece

(57) ABSTRACT

The present disclosure is directed towards methods and systems for determining a persuasiveness of a content item. The systems and methods receive a content item from a client device and analyze the content item. Analyzing the content item includes analyzing at least one textual element, at least one image element, and at least one layout element of the content item to determine a first persuasion score, a second persuasion score, and a third persuasion score of the elements the content item. The systems and methods also generate a persuasion score of the content item and provide the persuasion score of the content item to the client device.

20 Claims, 10 Drawing Sheets

(56) References Cited

U.S. PATENT DOCUMENTS

| | | | | |
|---|---|---|---|---|
| 2016/0072756 | A1* | 3/2016 | Aravkin | H04L 51/02 709/206 |
| 2016/0110082 | A1* | 4/2016 | Zhang | G06F 17/212 715/765 |
| 2016/0127297 | A1* | 5/2016 | Irmak | H04L 51/32 709/206 |
| 2017/0063870 | A1* | 3/2017 | Ebersman | H04L 51/04 |
| 2017/0076318 | A1* | 3/2017 | Goswami | G06Q 30/0245 |
| 2017/0277786 | A1* | 9/2017 | Mosley | G06Q 50/01 |

OTHER PUBLICATIONS

Burke, Patrick, 10 Commandments to Create Compelling Content, http://contentmarketinginstitute.com/2015/09/createcompelling-content-2/, Sep. 25, 2015.

Ng, Derrick. Engaging in Persuasive and Credible Communication. Coursera, https://www.coursera.org/learn/persuasive-communication, as accessed: Nov. 23, 2016.

Sherer, John, Mass Email Is Dead, Try This Modern Strategy Instead [SlideShare], https://blog.hubspot.com/sales/mass-email-marketing-ss#sm.00001aoa30wtpe3fzzu1egg75r920, Jul. 16, 2014.

Percolate, Create Better Content for Every Channel, https://percolate.com/product/create, as accessed: Nov. 23, 2016.

Kapost; Streamlined, Scalable, Content Creation; https://kapost.com/platform/execute/, as accessed Nov. 23, 2016.

The RebelMouseDCMS, https://www.rebelmouse.com/welcome/dcmsfeatures.html, as accessed: Nov. 23, 2016.

Heatmap Fetaures, https://heatmap.me/#features, as accessed: Nov. 23, 2016.

Content Analytics, http://www.opentext.com/what-we-do/products/discovery/information-access-platform/content-analytics, as accessed: Nov. 23, 2016.

Lu, Xin, et al. "Rating Image Aesthetics Using Deep Learning." IEEE Transactions on Multimedia 17.11 (2015): 2021-2034.

A. Khosla, A. S. Raju, A. Torralba and A. Oliva; "Understanding and Predicting Image Memorability at a Large Scale"; International Conference on Computer Vision (ICCV), 2015 DOI 10.1109/ICCV.2015.275.

Kincaid, J. Peter, et al. Derivation of new readability formulas (automated readability index, fog count and flesch reading ease formula) for navy enlisted personnel. No. RBR-8-75. Naval Technical Training Command Millington TN Research Branch, 1975.

Heylighen, F. and Dewaele, J. M. 1999. Formality of Language: Definition, Measurement and Behavioral Determinants. Technical Report, B-1050, Free University of Brussels, Brussels, Belgium.

Kumar, Minu. "Aesthetic principles of product form and cognitive appraisals: Predicting emotional responses to beauty." The psychology of design: Creating consumer appeal (2016): 234-251.

Khosla, Aditya, et al. "Memorability of image regions." Advances in Neural Information Processing Systems. 2012.

Graesser, Arthur C., Danielle S. McNamara, and Jonna M. Kulikowich. "Coh-Metrix providing multilevel analyses of text characteristics." Educational researcher 40.5 (2011): 223-234.

Li, Haiying, Zhiqiang Cai, and Arthur C. Graesser. "Comparing Two Measures for Formality." FLAIRS Conference. 2013.

Fogg, Brian J. "Persuasive technology: using computers to change what we think and do." Ubiquity 2002.Dec. 2002: 5.

Hauser, John R., et al. "Website morphing." Marketing Science 28.2 (2009): 202-223.

King, Gary, and Langche Zeng. "Logistic regression in rare events data." Political analysis 9.2 (2001): 137-163.

\* cited by examiner

DETERMINING PERSUASIVENESS OF USER-AUTHORED DIGITAL CONTENT ITEMS

BACKGROUND

Due to the increasing popularity of digital communication (e.g., online communication), entities (e.g., merchants, companies, advertisers, etc.) are continuously trying to find effective ways to engage with a user audience (e.g., potential customers). For example, one way entities often try to engage potential customers is through email. Users, however, often do not open emails, and even when a user opens an email, the user rarely interacts with media items in the email (e.g., advertisement links). Furthermore, due to increased threats in electronic security, users often view emails as a potential security threat (e.g., a computer virus) and avoid interacting with media items within emails. Accordingly, entities are continually trying to find persuasive methods of engaging users while establishing credibility.

One problem with many conventional methods of trying to produce persuasive and engaging media items (e.g., within emails) is that conventional systems do not provide any indication of the effectiveness of a media item at the time of authoring (e.g., when the author creates the media items). Rather, to determine the persuasiveness of a media item, the author often creates the media item, provides the media item to recipients, and then monitors a resulting performance of the media item (e.g., a click-through rate of the media item) to determine the persuasiveness of the media item. Furthermore, an author may create a first media item that is successful (e.g., persuasive) and a second media item that is unsuccessful, yet the author may not understand why the first media item was successful in comparison to the second media item. Thus, conventional systems result in wasted time, wasted communication resources, and an increase in author frustration.

In an attempt to solve the above-described problems, some conventional systems provide a generic analysis of media items, however, these conventional systems often merely identify quantitative characteristics of a media item (e.g., a sharpness, contrast, brightness of an image). Unfortunately, for authors, quantitative characteristics of a media item do little to inform an author about the effectiveness of a media item to engage a recipient. Put another way, conventional systems are unable to provide any correlation to the quantitative characteristics and a probability that a user will interact with (e.g., click on) the on the media item. Thus, authors fall back on using a trial-and-error approach to create and distribute media items.

Accordingly, these and other disadvantages exist with respect to conventional media creation systems.

BRIEF SUMMARY

The various embodiments described below provide benefits and/or solve one or more of the foregoing or other problems in the art with systems and methods for determining a persuasiveness of digital content items (e.g., digital media items). In particular, the systems and methods provide an accurate probability that a recipient of a given content item will interact with the content item (e.g., the content item will result in a click-through conversion). For example, the systems and methods disclosed herein analyze various elements (e.g., text, image, layout) of a content item to provide an author an indication of the persuasiveness of each of the various elements of the content item. In addition, the systems and methods further determine an overall persuasiveness of the content item based on each of the various elements. In other words, the systems and methods determine a probability that an intended recipient of the content item will interact (e.g., click on) the content item.

In one or more embodiments, the systems and methods analyze various elements of a content item to determine a persuasiveness of the content item. For example, the systems and methods analyze one or more of at least one textual element (e.g., a text box), at least one image element (e.g., a digital photo), or at least one layout element (e.g., size, position) of the content item to determine the persuasiveness of a content item. In addition, in some embodiments, the systems and methods further consider one or more intended recipient attributes (e.g., user profile and activity information). Accordingly, based on the analysis of various elements of the content item and on the one or more recipient attributes, the systems and methods determine whether or not a recipient is likely to interact with the content item (e.g., the persuasiveness of the content item).

Due to the systems and methods determining an accurate probability that recipients are likely to interact with a content item prior to sending the content item to intended recipients, the systems and methods reduce or eliminate wasting communication resources and author time. In particular, the systems and methods remove the need for an author to perform an iterative trial-and-error process of attempting to create an effective content item, providing the content item to intended recipients, and then monitoring a resulting performance of the content item. Additionally, the systems and methods provide indications as to the importance of each element of the content item in relation to the persuasiveness of the content item, which in turn, allows the author to use the systems and methods to modify a content item to increase or optimize the persuasiveness of the content item.

Additional features and advantages of the embodiments will be set forth in the description that follows, and in part will be obvious from the description, or may be learned by the practice of such example embodiments. The features and advantages of such embodiments may be realized and obtained by means of the instruments and combinations particularly pointed out in the appended claims. These, and other features, will become more fully apparent from the following description and appended claims, or may be learned by the practice of such example embodiments as set forth hereinafter.

BRIEF DESCRIPTION OF THE DRAWINGS

Various embodiments will be described and explained with additional specificity and detail through the use of the accompanying drawings in which.

DETAILED DESCRIPTION

Figure 1:
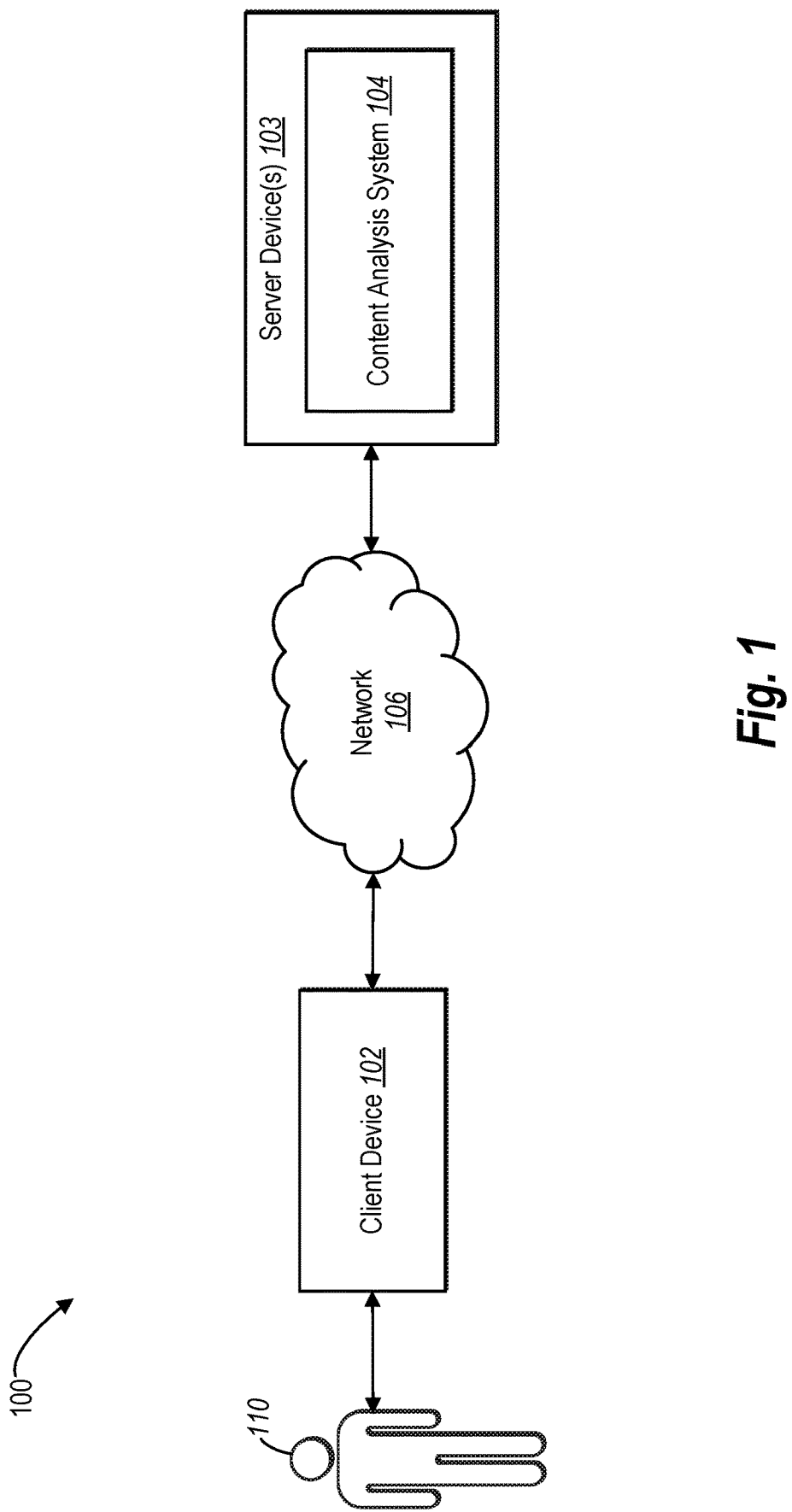
FIG. 1 illustrates a schematic diagram of a communication system in accordance with one or more embodiments.

The various embodiments described herein provide a content analysis system for determining a persuasiveness of a content item. For example, the content analysis system can analyze one or more characteristics of a content item (e.g., words, design, images) to determine a persuasion score that indicates a measure of persuasiveness of the content item based on the characteristics of the content item. Moreover, by further considering attributes of intended recipients, some embodiments of the content analysis system further determine a probability click-through rate that represents the likelihood that a content item will persuade intended recipients to interact with the content item (e.g., click on the content item). In one or more embodiments, the content analysis system analyzes multiple content items within a single electronic communication (e.g., an email) to determine a probability click-through rate of the electronic communication as a whole.

In order to determine the persuasiveness of a content item, the content analysis system analyzes various content item characteristics. For example, in some embodiments, the content analysis system analyzes one or more of textual elements, image elements, and layout elements (referred to herein collectively as "elements") of the content item to determine an amount of influence that each element has on a persuasiveness of the content item. Based on the influence each element has on the persuasiveness of the content item, the content analysis system determines a persuasion score for the content item that represents the combined persuasiveness of the one or more elements.

In one or more embodiments, the content analysis system uses the persuasion score to classify the content item as either persuasive or unpersuasive. For instance, the content analysis system determines a persuasion score threshold above which indicates a positive outcome (e.g., that a recipient will click on the content item). In some embodiments, therefore, the content analysis system provides a binary classification to an author that indicates whether the content item is likely to be persuasive, or whether the content item is likely to be unpersuasive. In the event the content analysis system provides a result indicating the content item is unpersuasive, the content analysis system provides the author meaningful insight and/or recommendations that allow the author to modify and increase the persuasive quality of the content item prior to sending the content item to recipients.

In addition to providing a binary classification of a content item as either persuasive or unpersuasive, the content analysis system can further determine a probability click-through rate with respect to a particular audience of viewers. In particular, in addition to analyzing one or more elements of a content item, some embodiments of the content analysis system further consider attributes of intended recipients of the content item. For example, in one or more embodiments, an author of a content item can select or otherwise define intended recipients to create an intended audience for the content item (e.g., intended recipients of an email that includes the content item). Based on attributes corresponding to the intended recipients (e.g., user profile information, previous user activity, etc.), the content analysis system determines a persuasion score for a content item with respect to the intended recipients.

For example, in one or more embodiments, the content analysis system determines a persuasion score for a content item with regard to each intended recipient. Furthermore, using the persuasion score for each intended recipient, the content analysis system performs a probability correction adjustment to determine an interaction probability for each intended recipient (e.g., a probability that a particular intended recipient will interact with a content item). As will be discussed in detail below, the probability correction adjustment accounts for a sampling size of previous click-through data that the content analysis system uses to determine a persuasion score with regard to each intended recipient. Nevertheless, using the predicted interaction probabilities for each intended recipient, the content analysis system calculates a probability click-through rate for the content item with respect to the intended audience (e.g., with respect to all selected recipients). An author can then modify or otherwise edit a content item in a manner that optimizes the probability click-through rate for the intended audience.

Moreover, in many cases, an author may wish to create an electronic communication that includes multiple content items (e.g., an email with multiple selectable content items). In such a case, the content analysis system performs one or more of the above processes to determine a persuasiveness for each of the multiple content items within the electronic communication, and then determines an overall persuasiveness of the electronic communication based on the persuasiveness of each of the multiple content items. For example, in one or more embodiments, the content analysis system combines multiple probability click-through rates corresponding to each of the multiple content items based upon size and position characteristics of the content items within the electronic communication. Accordingly, the content analysis system can generate an overall probability click-through rate, for an intended audience, of an electronic communication including multiple content items.

In view of the foregoing, the content analysis system provides several advantages over conventional systems. For example, and unlike conventional systems, the content analysis system removes author biases (or other human biases) in determining the persuasiveness of a content item. Rather, the content analysis system informs the author of the importance (e.g., the persuasiveness) of each element of a content item at the time of authoring, the persuasiveness of the content item as a whole, and/or the probability click-through rate with respect to an audience of intended recipients.

Moreover, unlike conventional systems, which often require actual feedback data from recipients to determine the persuasiveness of a content item, the content analysis system can inform the author of the persuasiveness of the content item at the time of authoring. As a result, the content analysis system removes any need to perform a trial-and-error iterative process to determine an effectiveness of a content item. In other words, the content analysis system of the present disclosure avoids the frustrating and time intensive process of sending a content item to recipients, and then monitoring recipient interaction to "wait and see" whether the content item is persuasive. Moreover, one of ordinary skill in the art will readily recognize that the above-described advantages will increase a click-through rate of the content items generated by the content analysis system, which will lead to additional recipient interaction. Thus, the content analysis system results in more effective and engaging electronic communications.

Furthermore, the content analysis system described herein provides improvements in the performance of a computer system. For example, because the content analysis system avoids an iterative trail-and-error process of sending out content item and monitoring interaction to determine whether the content item was persuasive, the content analysis system reduces required processing power, memory, and communication resources needed to determine the persuasiveness of a content item in comparison to conventional systems. Furthermore, because content analysis system can result in only persuasive content items being sent out to recipients (e.g., as opposed to multiple rounds of content items in the conventional iterative process), fewer content items are sent to recipients. Accordingly, the content analysis system results in less data transfer and data bandwidth usage for a computer/communication system. In other words, the content analysis system results in less required processing power and communication bandwidth in comparison to conventional systems.

In accordance with the principles described above, the content analysis system described herein provides content items that are more likely to persuade or appeal to a user's (e.g., a viewer's) mind. Persuasiveness of a content item can be viewed as a combination of pathos, ethos, and logos. For example, a content item is more likely to be persuasive when the content item connects with the viewer's emotions (pathos), establishes credibility (ethos) with the viewer, and presents logical reasoning (logos) to the viewer. Accordingly, one or more embodiments of the content analysis system measure characteristics and attributes of a content item that are related to emotions, credibility, and logic to determine whether a content item is persuasive.

For example, various embodiments of the content analysis system can analyze characteristics and attributes of visual elements, textual elements, and layout of a content item. Images are effective in appealing to a viewer's emotions, and thus, image elements correspond to the pathos concept of persuasion. Furthermore, credibility is based in trust, which is developed via personalization, positivity, plausibility, and plain-spokenness of language or text, and as such, text elements correspond to the ethos concept of persuasion. Moreover, the organization or layout of a content item naturally provides an aspect of logical reasoning, and accordingly, the layout of a content item corresponds to the logos concept of persuasion. Thus, because the content analysis system of the present disclosure determines persuasion scores based on textual elements (ethos), image elements (pathos), and layout elements (logos) of the content item, the content analysis system is more likely to determine a persuasion score that reflects actual viewer sentiments and is representative of how persuasive the content item is to a viewer's mind.

As used herein, the term "content item" refers to a digital media item. For example, a content item may include one or more of a textual element (e.g., a word), an image element (e.g., a digital photo), and a layout element (e.g., a size, a format). In other embodiments, a content item can include additional elements, such as audio elements, video elements, animation elements, or other types of audio/visual media elements. In addition, in one or more embodiments, a recipient can select a content item, for instance, the content item includes a hyperlink (e.g. is associated with a uniform resource locator ("URL")). Although content items take many forms, for illustration purposes, an example content item can include digital photos of varying sizes having an arrangement with defined positions relative to one another, and text overlaid one or more of the digital photos. In addition, the entirety of the content item can be a selectable link that directs a recipient to a defined URL in response to a user interacting with the content item (e.g., clicking on the content item).

As used herein, the term "persuasion score" refers to a measure that indicates whether a content item is likely to be persuasive or unpersuasive. For example, a persuasion score can refer to a value indicating a likelihood that a content item will persuade a recipient to interact with the content item. In some embodiments, the term persuasion score can refer to a binary value that indicates whether or not the content item is persuasive (e.g., 1=persuasive, 0=unpersuasive). In one or more embodiments, the persuasion score is based on characteristics of a content item and/or intended recipient attributes, as will be further described below.

As further used herein, the term "interaction probability" refers to a probability that a particular intended recipient interacts with a content item. For example, an interaction probability can include a fraction, percentage, or other statistical indication of the likelihood that a particular intended recipient interacts with a content item. A recipient interacting with a content item can include a recipient selecting (e.g., clicking on) a content item, for example. In addition, as used herein, the term "probability click-through rate," refers to a predicted interaction rate of an audience of multiple intended recipients. For example, a probability click-through rate can be a predicted fraction or percentage of intended recipients within a defined audience that will interact with a content item.

FIG. 1 illustrates a schematic diagram of an example communication system 100 in which a content analysis system operates in accordance with one or more embodiments. As illustrated, the communication system 100 includes a client device 102, a server device(s) 103, a content analysis system 104, and a network 106. The client device 102 and the server device(s) 103 communicate via the network 106. The network 106 can include one or more networks, such as the Internet, and can use one or more communications platforms or technologies suitable for transmitting data and/or communication signals. Although FIG. 1 illustrates a particular arrangement of the client device 102, the server device(s) 103, the content analysis system 104, and the network 106, various additional arrangements are possible. For example, the content analysis system 104 on the server device(s) 103, can directly communicate with the client device 102, bypassing the network 106.

As illustrated in FIG. 1, a user 110 can interface with the client device 102, for example, to communicate with the content analysis system 104 and to utilize the content analysis system 104 to determine a persuasiveness of a content item. The user 110 can be an individual (i.e., human user), a business, a group, or any other entity. In addition, the user 110 can be an author of the content item and can upload the content item to the content analysis system 104 via the client device 102 and/or the network 106. In addition, or alternatively, the user 110 can be a consumer of the content item (e.g., a viewer of the content item). In other words, the user 110 can be a recipient of the content item. Although FIG. 1 illustrates only one user 110 associated with the single client device 102, the communication system 100 can include any number of a plurality of users that each interact with the communication system 100 using a corresponding client device.

Both the client device 102 and the server device(s) 103 can represent various types of computing devices with which users can interact. For example, the client device 102 can be a mobile device (e.g., a cell phone, a smartphone, a PDA, a tablet, a laptop, a watch, a wearable device, etc.). In some embodiments, however, the client device 102 can be a non-mobile device (e.g., a desktop or server). In addition, the server device(s) 103 can be any type of server computing device. In one or more embodiments, the content analysis system 104 operates on the client device 102. Accordingly, the content analysis system 104 can either perform an online or offline workflow according to the principles described below. Additional details with respect to the client device 102 and the server device(s) 103 are discussed below with respect to FIG. 8.

Figure 2:
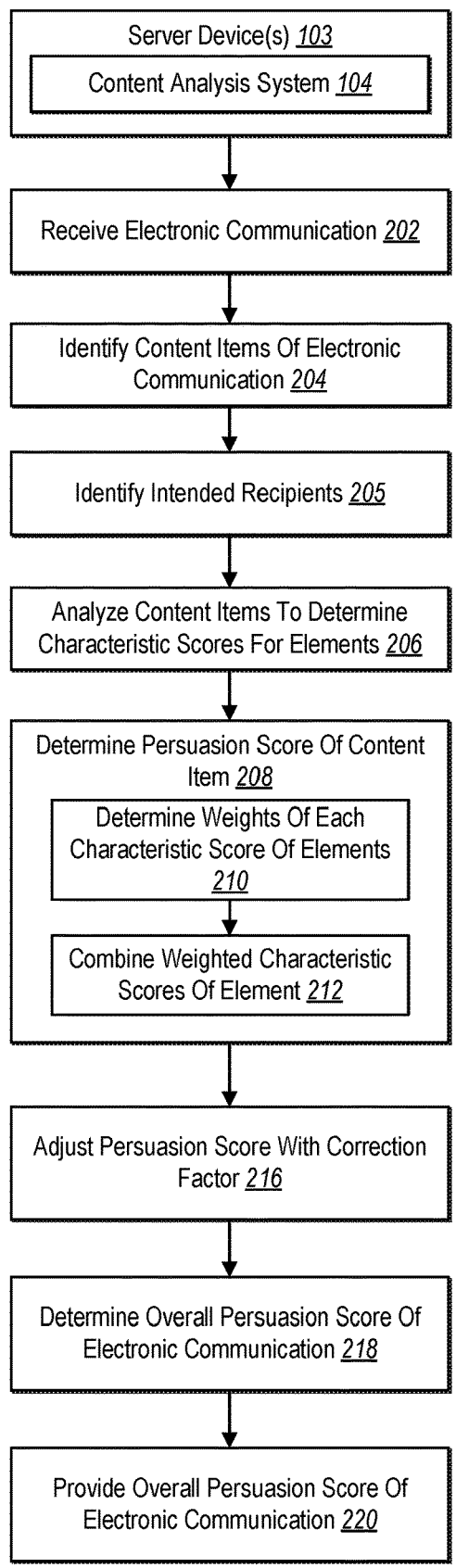
FIG. 2 illustrates a sequence-flow diagram of determining a persuasiveness of a content item in accordance with one or more embodiments.

As described in further detail below with regard to FIGS. 2-5C, the content analysis system 104 receives authored content items from a user (e.g., from the user 110 via the client device 102) and analyzes the content items to determine a persuasiveness (e.g., a persuasion score) of the content items. In particular, FIG. 2 illustrates example embodiments of the content analysis system 104 via a sequence-flow diagram. For instance, FIG. 2 illustrates one or more embodiments of a sequence-flow that the content analysis system 104 uses to determine a persuasiveness of a content item. In particular, FIG. 2 illustrates one or more example acts. To perform these acts, the content analysis system 104 includes computer-executable instructions that, when executed by at least one processor of the server device(s) 103, cause the server device(s) 103 of the content analysis system 104 to perform the acts shown in the sequence-flow diagram of FIG. 2.

The content analysis system 104 shown in FIG. 2 may be an example embodiment of the content analysis system 104 described above in regard to FIG. 1. As shown in act 202 of FIG. 2, the content analysis system 104 receives an electronic communication from the client device 102 (e.g., an email). For example, the client device 102 can upload an electronic communication to the content analysis system 104 via the network 106. Put another way, the user 110 of the client device 102 can interact with the client device 102 to cause the client device 102 to provide the electronic communication to the content analysis system 104. Alternatively, in one or more embodiments, the user 110 can create the electronic communication within the content analysis system 104, and as such, the electronic communication and/or the content items may already be present within the content analysis system 104. Accordingly, in at least some embodiments, the act 202 of receiving an electronic communication may not occur.

As described above, the content item is described herein as being provided within an electronic communication. As used herein, the term "electronic communication" means any digital communication object. For example, in some embodiments, the content analysis system 104 can receive the content item within one or more of an email, a text message, a post (e.g., a social media post), an event, a notification, or any other suitable digital communication object capable of including at least one content item. In addition, the content analysis system 104 can receive an analyze a content item in isolation, meaning, the content analysis system 104 does not have to necessarily analyze a content item with respect to an electronic communication.

In response to receiving an electronic communication to analyze, in one or more embodiments, the content analysis system 104 identifies one or more content items included in the electronic communication, as shown in act 204 of FIG. 2. In other words, the content analysis system 104 detects (e.g., identifies) the one or more content items included within the electronic communication (e.g., within the body of the email and/or as attachments). For example, the content analysis system 104 identifies various content elements that are associated with a particular URL to identify and particular content item. Accordingly, the content analysis system 104 can identify multiple content items within an electronic communication corresponding to multiple URLs within the electronic communication.

Additionally, the content analysis system 104 identifies intended recipients of the content items. For example, the content analysis system 104 can identify intended recipients by detecting user interactions selecting intended recipients from a list and/or detecting user interactions providing a list of intended recipients. For instance, as will be discussed in greater detail below in regard to FIGS. 5A-5C, the content analysis system 104 can detect a user interacting (e.g., user interactions) with one or more of the graphical user interfaces in order to identify the intended recipients.

In addition to identifying the content items and the intended recipients, the content analysis system 104 analyzes the content items and intended recipients, as shown in act 206 of FIG. 2. For example, the content analysis system 104 analyzes a content item to identify elements of the content item, intended recipients of the content item, and characteristics of the elements and intended recipients. In addition, in one or more embodiments, the content analysis system 104 can determine a characteristic score associated with particular characteristics of elements and intended recipients. As will be discussed in greater detail below, the content analysis system 104 can analyze at least one textual element, at least one image element, at least one layout element, and/or at least one intended recipient characteristic to determine the influence that the elements and intended recipient attributes or characteristics have on the persuasiveness of the content item.

Figure 3:
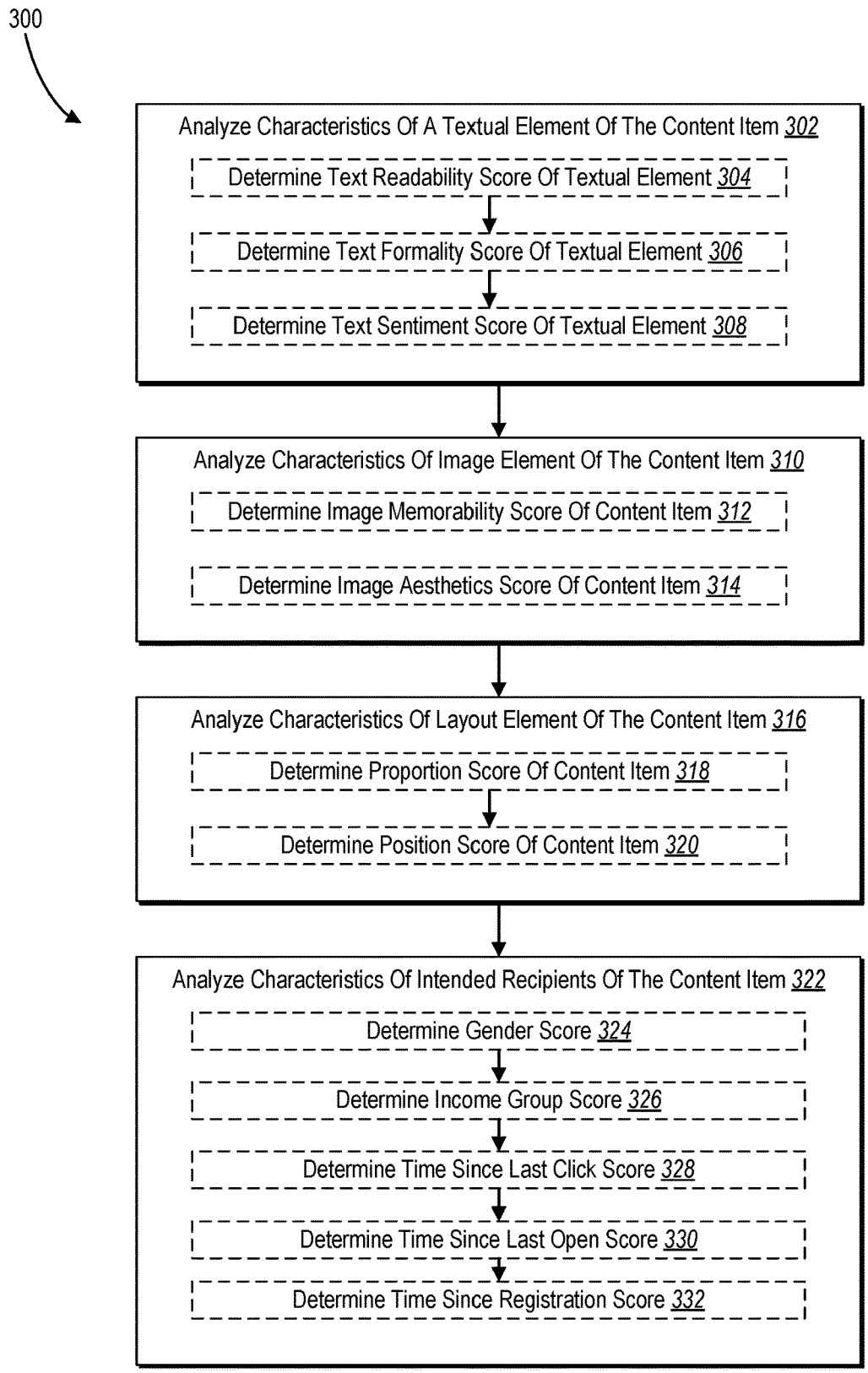
FIG. 3 illustrates a sequence-flow diagram of analyzing elements and an intended recipient of a content item in accordance with one or more embodiments.

In particular, FIG. 3 illustrates an example sequence-flow diagram of methods and processes that the content analysis system 104 uses in act 206 of FIG. 2 to analyze a content item to determine a scores for element characteristics and intended recipient characteristics. As used herein, the term "characteristic score," or simply "score" when used in regard to characteristics of content item elements or intended recipients, refers to an assessed indication (e.g., a numerical value) of a measurable and/or determinable aspect (e.g., quality, amount, classification, character, etc.) of a characteristic. Accordingly, FIG. 3 illustrates an example sequence-flow for determining various example characteristic scores associated with elements of a content item and/or attributes of intended recipients. In particular, FIG. 3 illustrates one or more example acts. To perform these acts, the content analysis system 104 includes computer-executable instructions that, when executed by at least one processor of the server device(s) 103, cause the server device(s) 103 of the content analysis system 104 to perform the acts shown in the sequence-flow diagram of FIG. 3.

As shown in FIG. 3, the content analysis system 104 analyzes characteristics of a textual element of the content item, as show in act 302. As used herein the term "textual element" refers to a digital representation of one or more words, numbers, and/or or any written language reference included anywhere within the content item. In some embodiments, a textual element can include a "text box" that defines an area of a textual element. Analyzing characteristics of a textual element within a content item can include determining a text readability characteristic of the textual element, determining a text formality characteristic of the textual element, determining a text sentiment characteristic of the textual element, and/or determining or otherwise identifying additional text characteristics of the textual element. Each of the foregoing examples is discussed in greater detail below.

As noted above, in some embodiments, the content analysis system 104 determines a text readability characteristic of a textual element. The text readability characteristic of a textual element is a measure of how easily or effectively a textual element conveys its intended meaning to a reader (e.g., an intended recipient). In some embodiments, the content analysis system 104 can determine the text readability of the textual element utilizing a natural language processing ("NLP") system for processing and deriving meaning from human and/or natural language input (e.g., the textual element).

In particular, to determine a measure of text readability of the textual element, the content analysis system 104 determines a text readability score of the textual element, as shown in act 304 of FIG. 3. In some embodiments, the content analysis system 104 can determine the text readability score of the textual element utilizing a NLP system (e.g., as described above). Furthermore, utilizing a NLP system, the content analysis system 104 can consider (e.g., analyze) one or more of typeface, font size, spacing, layout, vocabulary difficulty, text structure, text coherence and cohesion, and syntax to determine a text readability score. Specifically, based on the above-factors, the content analysis system 104 can determine and assign a text readability score to the textual element of the content item.

For example, the content analysis system 104 can utilize one of more of the methods of determining a text readability score of a textual element described in Kincaid, J. Peter, et al. *Derivation of new readability formulas (automated readability index, fog count and flesch reading ease formula) for navy enlisted personnel*, Naval Technical Training Command Millington Tenn. Research Branch No. RBR-8-75 (1975), the disclosure of which is incorporated in its entirety by reference herein. Furthermore, the content analysis system 104 can store data representing the text readability score within a persuasion score database and can associate the text readability score with the textual element, e.g., within a table.

In addition to determining text readability characteristic, in one or more embodiments, the content analysis system 104 analyzes the textual element to determine a text formality characteristic. A text formality characteristic represents a level of ambiguity and context-dependence of the textual element. In some embodiments, the content analysis system 104 can determine a text formality utilizing an NLP system. For instance, and as a non-limiting example, the content analysis system 104 can utilize one or more of the methods of determining a text formality of a textual element as described in Heylighen, F. et al., *Formality of Language: Definition, Measurement and Behavioral Determinants*. Technical Report, Free University of Brussels B-1050 (1999) and/or Li, Haiying et al., *Comparing Two Measures for Formality*, FLAIRS Conference, (2013), the disclosures of which are incorporated in their entirety by reference herein.

Based on analyzing the text formality of the textual element, the content analysis system 104 determines a text formality score of the textual element, as shown in act 306 of FIG. 3. For example, utilizing one or more of the methods described above, the content analysis system 104 can consider proportions of different word types, with nouns, adjectives, articles, and prepositions as positive elements; and adverbs, verbs, and interjections as negative elements, to determine the text formality score. Specifically, based on the above-factors, the content analysis system 104 can determine and assign a text formality score to the textual element of the content item. Furthermore, the content analysis system 104 can store data representing the text formality score within the persuasion score database and can associate the text formality score with the textual element, e.g., within a table.

As discussed above, in some embodiments, the content analysis system 104 can also determine a text sentiment characteristic of a textual element. The text sentiment characteristic represents a subjective meaning or feeling that a text element is likely to provide to a reader (e.g., an intended recipient). To determine a text sentiment, the content analysis system 104 identifies and extracts subjective information from text using, for example, one or more of the NPL systems described above.

As with other element characteristics, the content analysis system 104 determines a measure of text sentiment by generating a text sentiment score of the textual element, as shown in act 308 of FIG. 3. In some instances, the content analysis system 104 determines the text sentiment score of the textual element utilizing the NLP system. One skilled in the art with recognize, based on the disclosure herein, that various methods known in the art can be used to determine a text sentiment score. Furthermore, the content analysis system 104 can associate the text sentiment score with the textual element. For example, the content analysis system 104 can store data representing the text sentiment score within the persuasion score database associating the text sentiment score with the textual element, e.g., within a table.

In addition to determining characteristics of the textual element of the content item, the content analysis system 104 analyzes characteristics of an image element of the content item, as shown in act 310 of FIG. 3. As used herein, the term "image element" refers to a visual component, or an aspect of a visual component within a content item. For example, an image element may refer to a digital photo, or a portion of a digital photo, a digital graphic, a digital video, or any other type of digital visual component included within a content item. In some embodiments, determining characteristics of an image element of the content item can include determining an image memorability of the content item, determining an image aesthetic of the content item, and/or determining or otherwise identifying additional image characteristics of the image element.

As mentioned briefly above, the content analysis system 104 can determine an image memorability characteristic of an image element of the content item. For example, the image memorability characteristic is a measure of how likely the image element will be remembered by an intended recipient. In some embodiments, the content analysis system 104 determines the image memorability of the image element utilizing a digital image processing ("DIP") system for extracting statistical data from the image element. For example, the content analysis system 104 can utilize one or more of the methods of determining image memorability of an image element as described in Khosla, Aditya, et al., *Memorability of image regions*, Advances in Neural Information Processing Systems, (2012) or Khosla, Aditya et al., *Image Memorability and Visual Inception*, In SIGGRAPH, (2012), the disclosures of which are incorporated in their entireties by reference herein.

Furthermore, the content analysis system 104 determines an image memorability score of the image element, as shown in act 312 of FIG. 3. In one or more embodiments, the content analysis system 104 can determine the image memorability score of the image element utilizing a DIP system, as described above. For instance, to determine an image memorability score, the content analysis system 104 analyzes one or more of colors, shapes, texture and/or gradient, image noise (i.e., random variations of brightness or color information), and/or other characteristics of an image element. Moreover, the content analysis system 104 can store data representing the image memorability score within the persuasion score database and can associate the image memorability score with the image element, e.g., within a table.

As also mentioned above, the content analysis system 104 analyzes image aesthetics of the image element of the content item. Image aesthetics is a measure a human sensory impression in response to visual aspects of the image element. For example, image aesthetics can include a measure of whether a viewer (e.g., intended recipient) is attracted or otherwise interested in an image element. In some embodiments, the content analysis system 104 can analyze the image aesthetics of the image element utilizing the DIP system. For example, the content analysis system 104 can utilize a deep learning (e.g., machine learning) approach for determining an image aesthetic of an image element as described in Lu, Xin, et al. *Rating Image Aesthetics Using Deep Learning*, IEEE Transactions on Multimedia 17.11, 2021-2034 (2015), the disclosure of which is incorporated in its entirety by reference herein.

Furthermore, based on analyzing the image element, the content analysis system 104 determines an image aesthetics score of the image element, as shown in act 314 of FIG. 3. In one or more embodiments, the content analysis system 104 can determine the image aesthetics score of the image element utilizing a DIP system, as described above. In particular, the content analysis system 104 can consider image organization of the image element, whether or not the image element follows the rule of thirds, object repetition within the image element, a depth of field of the image element, a lighting of the image element, symmetry within the image element, a color scheme of the image element, motion blur within the image element, object emphasis within the image element, and/or a color harmony of the image element. Moreover, the content analysis system 104 can store data representing the image aesthetics score within the persuasion score database, and can associate the image aesthetics score with the image element, e.g., within a table. In some embodiments, the content analysis system 104 can utilize machine learning (e.g., content feature recognition technology) to determine the image aesthetics score of the image element.

In addition to analyzing characteristics of an image element of the content item, the content analysis system 104 analyzes characteristics of a layout element of the content item, as shown in act 316 of FIG. 3. In general, a layout element of a content item is a measure of position, proportion, size, and arrangement of various other elements within a content item. For example, a layout element can represent the position, proportion, size, and/or arrangement relationship of one or more textual elements and/or one or more image elements. For instance, in one or more embodiments, analyzing the characteristics of the layout element of the content item can include analyzing a proportion of an area corresponding to the image element with respect to a total area of the content item. For example, the content analysis system 104 can analyze a size of the image element relative to a total size of the content item. In particular, utilizing the DIP system, the content analysis system 104 can determine a size (e.g., area) of the image element and can determine a total size (e.g., total area) of the content item. Upon determining the size of the image element and the total size of the content element, the content analysis system 104 can determine the proportion of the image element with respect to the content item.

Moreover, based on analyzing the proportion of the area corresponding to the image element with respect to the total area of the content item, the content analysis system 104 determines a proportion score of the content item, as shown in act 318 of FIG. 3. In some embodiments, the content analysis system 104 can determine a proportion score of the layout element. For example, as discussed above, the content analysis system 104 can determine a size (e.g., area) of the image element and can determine a total size (e.g., total area) of the content item utilizing the DIP system, and based on the proportion of the size of the image element with respect to the total size of the content item, the content analysis system 104 determines the proportion score of the content item. In one or more embodiments, the larger the proportion of the image element area is with respect to the total area of the content item, the larger the proportion score of the layout element. Further, the content analysis system 104 can store data representing the proportion score of the layout element within the persuasion score database and can associate the proportion score with the layout element, e.g., within a table.

As briefly mentioned above, the content analysis system 104 analyzes a position of the image element within the content item. In other words, the content analysis system 104 can analyze the position of the image element within the content item to determine a location of the image element within the content item. For example, in some embodiments, the content analysis system 104 can determine whether the image element is positioned within a top third (i.e., top $\frac{1}{3}^{rd}$), a middle third, or bottom third of the content item.

Moreover, based on the position of the image element within the content item, the content analysis system 104 determines a position score of the image element, as shown in act 320 of FIG. 3. In one or more embodiments, the content analysis system 104 determines a position of the image element within the content item utilizing the DIP system, and based on the position of the image element within the content item, the content analysis system 104 determines the position score of the content item. In one or more embodiments, the content analysis system associates the top third position of the content item with a highest score, the middle third position of the content item with a middle score, and the bottom third position of the content item with a lowest score.

In other embodiments, a different priority of position can be reflected in position scores. For example, depending on a position of a content item within an electronic communication, the position scores with respect to the content item may vary. Moreover, a position score can be based on a percentage of an image element within a particular portion of a content item. For instance, the content analysis system 104 can determine a position score based on determining that 20% of an image element that is positioned within the top third, 50% of the image element is positioned within the middle third, and 30% of the image element is positioned within the bottom third. Accordingly, the content analysis system 104 combines a weighted percentage for each third based on the percentage of the image element within each defined third of the content item. Further, the content analysis system 104 can store data representing the position score within the persuasion score database, and can associate the position score with the layout element, e.g., within a table.

In addition to analyzing characteristics of the image element of the content item, the content analysis system 104 analyzes characteristics of an intended recipient (e.g., intended viewer) of the content item, as shown in act 322 of FIG. 3. For example, the content analysis system 104 analyzes characteristics of the intended recipient that can impact the persuasiveness of the content item with specific respect to the intended recipient. For example, based on the identified recipients (see act 205 on FIG. 2), the content analysis system 104 can access a database of potential recipients.

In particular, the database of potential recipients can include a database of potential recipients (e.g., users) and a plurality of attributes or characteristics associated with each potential recipient. Attributes or characteristics of a potential recipient can include any digital data that is associated with a potential recipient, for example, personal information, activity information, demographic information, purchase histories, browsing histories, or any other type of analytic data that is generated based on input or activity that is ultimately associated with the potential recipient. Examples of potential recipient attributes or characteristics are provided below in specific detail, however, one skilled in the art will recognize, based on the disclosure herein, that the content analysis system 104 is not limited to the specific characteristics discussed below and may include more or fewer characteristics.

As an example, analyzing characteristics of an intended recipient can include determining a gender of the intended recipient. In some embodiments, the content analysis system 104 can determine the gender of the intended recipient based on a recipient profile. For example, the content analysis system 104 can query a recipient database of the content analysis system 104 to identify a recipient profile (e.g., a user profile) associated with the intended recipient, and based on the recipient profile, can determine a gender of the intended recipient. In additional embodiments, the content analysis system 104 can determine the gender of the intended recipient based on previous communications with the intended recipient and/or previous interactions (e.g., sales) with the intended recipient.

In response to determining the gender of the intended recipient, the content analysis system 104 determines a gender score of the intended recipient, as shown in act 324 of FIG. 3. In some embodiments, the gender score is a binary score representative an intended recipient's gender. In alternative embodiments, the gender score is dependent on the content item and the gender of the intended recipient. For example, if the content item relates to subject matter more likely to be of interest to a female, and the intended recipient is determined to be a female, the content analysis system 104 determines a higher gender score (e.g., indicating a higher persuasiveness for the intended recipient) than if the intended recipient is a male. In some embodiments, the content analysis system 104 can determine the gender score to be neutral. In other words, when the content item relates to subject matter likely to be of equal interest to males and females, the content analysis system 104 can neutralize the gender score. Furthermore, the content analysis system 104 can store data representing the gender score within the persuasion score database and can associate the gender score with the intended recipient.

In addition to determining a gender score, analyzing the characteristics of the intended recipient can include determining an income level of the intended recipient. In some embodiments, the content analysis system 104 can determine the income level of the intended recipient based on a recipient profile. For example, the content analysis system 104 can query the recipient database of the content analysis system 104 to identify a recipient profile (e.g., a user profile) associated with the intended recipient, and based on the recipient profile, can determine the income level of the intended recipient. In additional embodiments, the content analysis system 104 can determine the income level of the intended recipient based on previous communications with the intended recipient and/or previous interactions (e.g., sales) with the intended recipient.

In response to determining the income level of the intended recipient, the content analysis system 104 determines an income group score of the intended recipient, as shown in act 326 of FIG. 3. In one or more embodiments, the income group score can be dependent on both of the content item and the income level of the intended recipient. As a non-limiting example, if the content item relates to subject matter that is relatively expensive, and the intended recipient has a relatively high income level, the content analysis system 104 determines the income group score to be higher (e.g., the content analysis system 104 assigns a higher income group score) than if the intended recipient has a relatively low income level. As another non-limiting example, if the content analysis system 104 determines that the intended recipient has a relatively low income level, the content analysis system 104 determines that the intended recipient would not likely be persuaded by (e.g., be persuaded to interact with) a content item related to subject matter that is relatively expensive and determines the income group score to be relatively low. Conversely, if the content item relates to subject matter that is relatively inexpensive, the content analysis system 104 can determine the income group score to be relatively high regardless of the income level of the intended recipient. Further, the content analysis system 104 can store data representing the income group score within the persuasion score database and can associate the income group score with the intended recipient.

In addition to determining an income level of the intended recipient, the content analysis system 104 determines a time since the intended recipient last interacted (e.g., last clicked) with a content item. In some embodiments, the content analysis system 104 can determine a time since the intended recipient last interacted with a content item based on the recipient profile. For example, the content analysis system 104 can query the recipient database of the content analysis system 104 to identify when the intended recipient last interacted with a content item. In additional embodiments, the content analysis system 104 can determine and/or estimate when the intended recipient last interacted with a content item based on previous communications with the intended recipient and/or previous interactions (e.g., sales) with the intended recipient.

Upon determining a time since the intended recipient last clicked on a content item, the content analysis system 104 determines a time since last interaction score (or time since last click score) of the intended recipient, as shown in act 328 of FIG. 3. If the time since the intended recipient last interacted on a content item is relatively recent, the content analysis system 104 determines the time since last interaction score to be higher than if the time since the intended recipient last clicked on a content item is relatively long past. In other words, the more recent the time since the intended recipient last clicked on a content item the higher the time since last interaction score. Further, the content analysis system 104 can store data representing the time since last interaction score within the persuasion score database and can associate the time since last interaction score with the intended recipient.

Notwithstanding determining a time since last interaction score, the content analysis system 104 determines a time since the intended recipient last opened an electronic communication (e.g., an email that includes a content item). In some embodiments, the content analysis system 104 can determine when the intended recipient last opened an electronic communication. For example, the content analysis system 104 can query the recipient database of the content analysis system 104 to identify when the intended recipient last opened an electronic communication. In additional embodiments, the content analysis system 104 can determine and/or estimate the when the intended recipient last opened a communication having a content item based on previous communications with the intended recipient and/or previous interactions (e.g., sales) with the intended recipient.

Upon determining a time since the intended recipient last opened an electronic communication with a content item, the content analysis system 104 determines a time since last open score for the intended recipient, as shown in act 330 of FIG. 3. If the time since the intended recipient last opened a communication having a content item is relatively recent, the content analysis system 104 determines the time since last open score to be higher than if the time since the intended recipient last opened a communication having a content item is relatively long past. In other words, the more recent the time since the intended recipient last opened a communication having a content item the higher the time since last open score. Furthermore, the content analysis system 104 can store data representing the time since last open score within the persuasion score database and can associate the time since last open score with the intended recipient.

In addition to determining a time since the intended recipient last opened a communication having a content item, the content analysis system 104 determines a time since the intended recipient registered (e.g., registered an account or registered to receive electronic communications). For example, the content analysis system 104 can query the recipient database of the content analysis system 104, and based on a recipient profile and/or a registration record within the recipient database, the content analysis system 104 can identify when the intended recipient registered for a service.

Upon determining a time since the intended recipient registered, the content analysis system 104 determines a time since registration score of the intended recipient, as shown in act 332 of FIG. 3. If the time since the intended recipient last registered to receive communications with a content item is relatively recent, the content analysis system 104 determines the time since registration score to be higher than if the time since the intended recipient last registered to receive communications is relatively long past. In other words, the more recent the time since the intended recipient last registered to receive communications, the higher the time since registration score. Furthermore, the content analysis system 104 can store data representing the time since registration score within the persuasion score database and can associate time since registration to communications score with the intended recipient.

Although FIG. 3 shows various example element characteristics and various intended recipient characteristics use to determine various scores, alternative embodiments of the content analysis system 104 can analyze different types of elements (e.g., video elements, audio elements) and/or determine different types of characteristics for the elements included in FIG. 3 as well as elements not included in FIG. 3. Similarly, the content analysis system 322 can analyze different types of recipient attributes than those shown in FIG. 3, such as age, geographic location, computer device type an intended recipient owns or uses, and/or other attributes or characteristics of an intended recipient. Moreover, the content analysis system can determine additional characteristic scores based on analyzing different or additional characteristics of elements and/or intended recipients.

Returning again to FIG. 2, after analyzing the content items and the intended recipients, the content analysis system 104 determines a persuasion score for each of the content items within the electronic communication, as shown in act 208. As an overview, in some embodiments, the content analysis system 104 determines the persuasion score of a content item by determining weights of each of the above-described characteristic scores of the elements and the intended recipients, and combines the weighted characteristic scores to determine a persuasion score of the content item with respect to each intended recipient. Each of the foregoing acts is described below in greater detail.

As mentioned, the content analysis system determines weights for each characteristic score corresponding to the elements and the intended recipient, as shown in act 210 of FIG. 2. When used in regard to the characteristics of content item elements and/or an intended recipient, the term "weight," as used herein, refers to a measure of how much each characteristic affects whether or not the content item is persuasive. In some embodiments, the content analysis system 104 utilizes machine-learning (e.g., deep learning) techniques to train a machine-learning model in order to determine the weights of the characteristics. For example, the content analysis system 104 can utilize a predictive analytics machine learning model to determine a weight to assign to each characteristic score.

Figure 4:
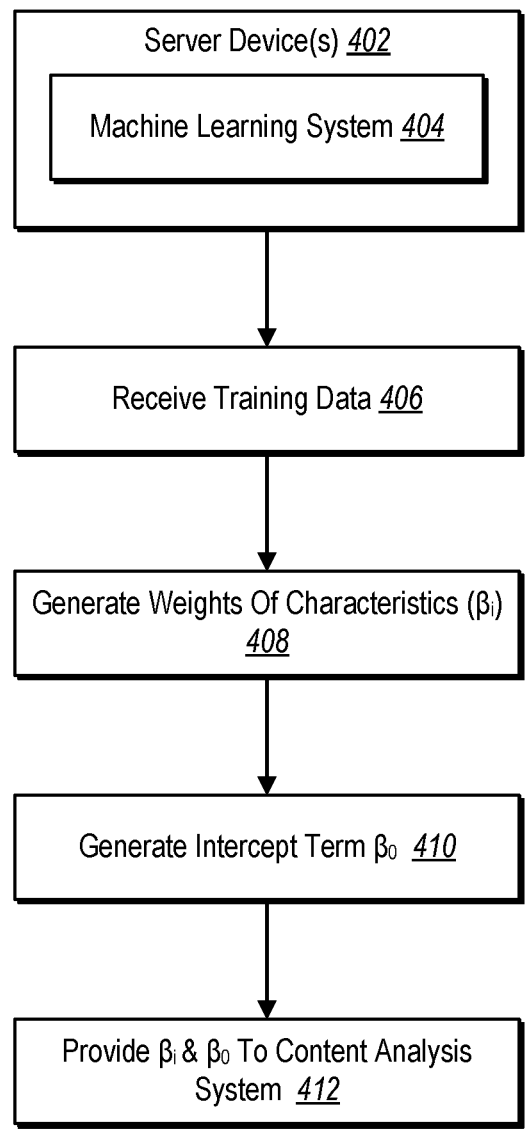
FIG. 4 illustrates a sequence-flow diagram of a machine learning system of a server device determining weights of characteristics of elements of the content item in accordance with one or more embodiments.

For example, in one or more embodiments, the content analysis system 104 obtains the weights from a machine learning model generated by a machine learning system (as shown in FIG. 4). For example, in general, a machine learning system processes an analysis dataset to generate (e.g., train) a machine learning model. In some embodiments, the content analysis system performs a generalized linear model with a binomial family (logistic regression) and a random forest to generate a machine learning model. Although, in alternative embodiments, various other types of machine learning methods may be used.

Notwithstanding the type of machine learning method, because the analysis dataset includes known characteristic scores for content items, known recipient characteristic scores, and known outcomes (e.g., whether or not a recipient interacted with the content item), the machine learning system can solve for the various weights (e.g., importance) of each of the characteristic scores. Based on assigning weights to the various characteristic scores for content items and recipient characteristic scores, the machine learning system can accurately predict an interaction outcome (e.g., predict that a user will interact with a content item or open an email).

In one or more examples, the analysis dataset comprises a number of data points described by:

$$\sum_{i=1}^{K} K_i N_i$$

where K represents the number of electronic communications, $K_i$ represents the number of content items within an electronic communication, and $N_i$ represents the number of recipients that opened an electronic communication (e.g., an "ith" communication). Accordingly, the analysis dataset includes a number of data points represented by the above equation with labels of 1 and 0 depending on whether or not a content item within the communication has been interacted with (e.g., clicked on) by the recipient.

Moreover, in one or more embodiments, the analysis dataset is divided into groups of data for the purpose of building a machine learning model and determining the characteristic weights. For example, in one or more embodiments, about sixty percent of the analysis dataset is used as training set to train the machine learning model, about twenty percent of the analysis dataset is used as a test set, and accordingly the remaining about twenty percent of the analysis dataset is used as a validation set. Determining the weights to associate with characteristic scores is further described with reference to FIG. 4.

In particular, FIG. 4 illustrates an example sequence-flow diagram of a machine learning system 404 on a server device 402 used to determine weights of the various characteristic scores corresponding to elements within a content item and to recipient characteristic scores corresponding to an intended recipient. In particular, FIG. 4 illustrates one or more example acts. To perform these acts, the content analysis system 104 includes computer-executable instructions that, when executed by at least one processor of the server device(s) 103, cause the server device(s) 103 of the content analysis system 104 to perform the acts shown in the sequence-flow diagram of FIG. 4.

As shown in act 406 of FIG. 4, the server device 402 and the machine learning system 404 receives training data (e.g., from the content analysis system 104 or from an analytics cloud server). The training data can include previous click-through data associated with users collected over a period of time (e.g., 3 months). In other words, the training data can include stats indicating previously provided communications (e.g., emails), previous content items, how many of the previously provided communications were opened by recipients, and, of the opened communications, how many of the content items included in the communications were interacted with (e.g., clicked on) by the users.

In some embodiments, the percentage of data points within the training data that represent a positive interaction (e.g., a click) can be a low percentage. Accordingly, the training dataset can naturally include a class imbalance (e.g., a large number of "no interaction" data points compared to a small number of "interaction" data points). Based on this class imbalance, the machine learning system 404 can under-sample to maintain a 1:1 ratio of "no interaction" data points and "interaction" data points. Although the machine learning system under-samples the data points to provide a 1:1 ratio, based on a logistic regression, the machine learning system 104 still generates weights that maintain the predictive properties of determining whether or not a recipient with known characteristic scores will interact with a particular content item with known element characteristics scores (e.g., a persuasion score of the content item with respect to the recipient).

Nevertheless, in response to receiving the training data, the machine-learning system 404 generates weights (e.g., $\beta_i$) for each characteristic score of the elements and each characteristic of an intended recipient (e.g., $x_i$), as shown in act 408 of FIG. 4. In particular, the machine-learning system 404 provides the weights for each type of element characteristic score and each type of recipient characteristic score as an output. Accordingly, the machine-learning system 404, in essence, compares element characteristic scores of content items and recipient characteristic scores of recipients of those content items with an interaction result to determine how much influence each of the element characteristic scores and recipient characteristic scores affect the interaction result. In other words, the machine-learning system 404 can determine correlations between the characteristics of the elements of content items, characteristics of recipients, and the interaction rate (e.g., click rate) of content items.

In addition to generating the weights for each element characteristic score and each recipient characteristic score, the machine-learning system 404 generates a linear intercept value ($\beta_o$), as is shown in act 410 of FIG. 4. For instance, based on a trained machine-learning model, the model can generate a plot of the data, determine a slope fitted to the data, and predict an intercept value. However, because of the under-sampling described above, the intercept value is often inaccurate and needs to be adjusted to provide an actual probability that a recipient will interact with a content item (e.g., a persuasion score). This adjustment of the intercept value will be described further below.

Upon determining the weights ($\beta_i$) and the intercept value ($\beta_o$), the server device 402 and the machine-learning system 404 can provide the weights and the intercept value to the content analysis system 104, as shown in act 412 of FIG. 4.

Returning again to FIG. 2, upon determining the weights associated with each of the characteristic scores (e.g., act 210 of FIG. 2), the content analysis system 104 combines (e.g., sums) the weighted characteristic scores determine a persuasion score for the content item, as shown in act 212 of FIG. 2. For example, the content analysis system 140 determines a persuasion score for a content item with respect to an intended recipient as follows:

$$\hat{\theta} = E(Y \mid X) = P(Y = 1) = \frac{e^{\beta_0 + \Sigma_i \beta_i x_i}}{1 + e^{\beta_0 + \Sigma_i \beta_i x_i}}$$

where $\hat{\theta}$ represents the persuasion score, $x_i$ represents the element characteristic scores and recipient characteristic scores, $\beta_i$ represents the weights of the characteristics scores, and $\beta_o$ represents the intercept value, as discussed above in regard to FIG. 4. Accordingly, the content analysis system 104 combines the weighted scores of the characteristics ($\beta_i$ $x_i$) of each element and each intended recipient characteristic to determine a persuasion score for the content item with respect to each particular intended recipient.

Additionally, and as shown in act 216 of FIG. 2, the content analysis system 104 adjusts the persuasion score for the content item with respect to each particular intended recipient to determine the predicted click-through rate of the content item with the following correction factor:

$$\beta'_0 = \beta_0 - \ln\left[\left(\frac{1-\tau}{\tau}\right)\left(\frac{\bar{y}}{1-\bar{y}}\right)\right] = \beta_0 - \ln\left[\left(\frac{1-\tau}{\tau}\right)\right]$$

where τ represents the fraction of the ones in the population (e.g., the fraction of content items that were clicked within the population), and where y represents the observed fraction of ones in the sample population (or sampling probability). For example, in some embodiments, τ can be equal to about 0.05 when there is a 5.0% positive class (e.g., 5.0% of the population clicked on content items). Additionally, $\bar{y}$ can be equal to about 0.5 when the sample population is under-sampled to maintain a 1:1 ratio in the training data (e.g., training data referred to in regard to FIG. 4). Accordingly, the correction factor can compensate for under-sampling of a population while maintaining the 1:1 ratio in the training data.

While the correction factor is not necessarily required for classifying outcomes of the persuasion scores into two groups (e.g., persuasive or not), the correction factor facilitates determining a predicted click-through rate of the content items. For example, without the correction factor, the intercept value may not be a consistent estimate (e.g., estimate via the machine-learning process described above), and accordingly, the persuasion score may not accurately reflect the predicted interaction rate.

After applying the correction factor, the content analysis system 104 combines the adjusted persuasion scores of all intended recipients of a content item to determine a persuasion score for the content item with respect to the set of intended recipients. For example, the content analysis system 104 averages the persuasion scores corresponding to each individual intended recipient to determine a persuasion score for the content item over all the intended recipients.

In addition to determining the predicted click-through rate of each content item of an electronic communication, the content analysis system 104 determines an overall persuasion score of the email, as shown in 218 of FIG. 2. For example, the content analysis system 104 determines the overall persuasion score of the electronic communication by performing a weighted sum of the predicted click-through rates of all of the content items in the email. Furthermore, the content items are weighted according to the proportions of their respective areas in comparison to an overall area of the electronic communication. The content analysis system 104 determines the proportions of content item area within the electronic communication using any of the methods described above in regard to act 316 of FIG. 3.

In response to determining the overall persuasion score of the electronic communication, the content analysis system 104 provides the overall persuasion score to the client device 102. For example, the content analysis system 104 can provide the overall persuasion score to the client device 102 via the network and/or a user interface of the content analysis system 104. The content analysis system 104 providing the overall persuasion score to the client device 102 is described in greater detail below in regard to FIGS. 5A-5C.

In addition to the foregoing description, operation of the content analysis system 104 can also be described in relation to algorithms, equations, or pseudocode performed by a computing device (e.g., a client device). More particular, a step of determining a persuasion score of a content item can involve the above described algorithms, equations, and/or acts described with reference to acts 208, 210, 212, and/or 216 in FIG. 2 and/or acts 406, 408, 410 and 408.

In particular, the content analysis system 104 can provide a step for determining a persuasion score of the content item. The step for determining a persuasion score of the content item can include determining weights ($\beta_i$) of the characteristics of the elements of the content item. Specifically, the step for determining a persuasion score of the content item can include generating weights ($\beta_i$) of the characteristics from training data utilizing a machine-learning system, such as, one or more of the machine-learning systems described above in regard to acts 406-412 of FIG. 4. Additionally, the step can include determining weights ($\beta_i$) of the characteristics of intended recipients.

Furthermore, the step can include combining the weighted scores ($\beta_i x_i$) of each of the element characteristics and intended recipient characteristics to determine a persuasion score of the content item. In particular, the step can include utilizing the following algorithm (described above in regard to FIG. 2) in combining the scores ($x_i$) of each of the characteristics and the weights ($\beta_i$) of each the characteristics of the elements and intended recipient of the content item:

$$\hat{\theta} = E(Y \mid X) = P(Y = 1) = \frac{e^{\beta_0 + \Sigma_i \beta_i x_i}}{1 + e^{\beta_0 + \Sigma_i \beta_i x_i}}$$

Likewise, the step can include adjusting the persuasion score of the content item utilizing a correction factor to determine the predicted click-through rate of the content item. Specifically, the step can utilize the following algorithm (described above in regard to FIG. 2) to determine the predicted click-through rate of the content item:

$$\beta'_0 = \beta_0 - \ln\left[\left(\frac{1-\tau}{\tau}\right)\left(\frac{\bar{y}}{1-\bar{y}}\right)\right] = \beta_0 - \ln\left[\left(\frac{1-\tau}{\tau}\right)\right]$$

Figure 5A:
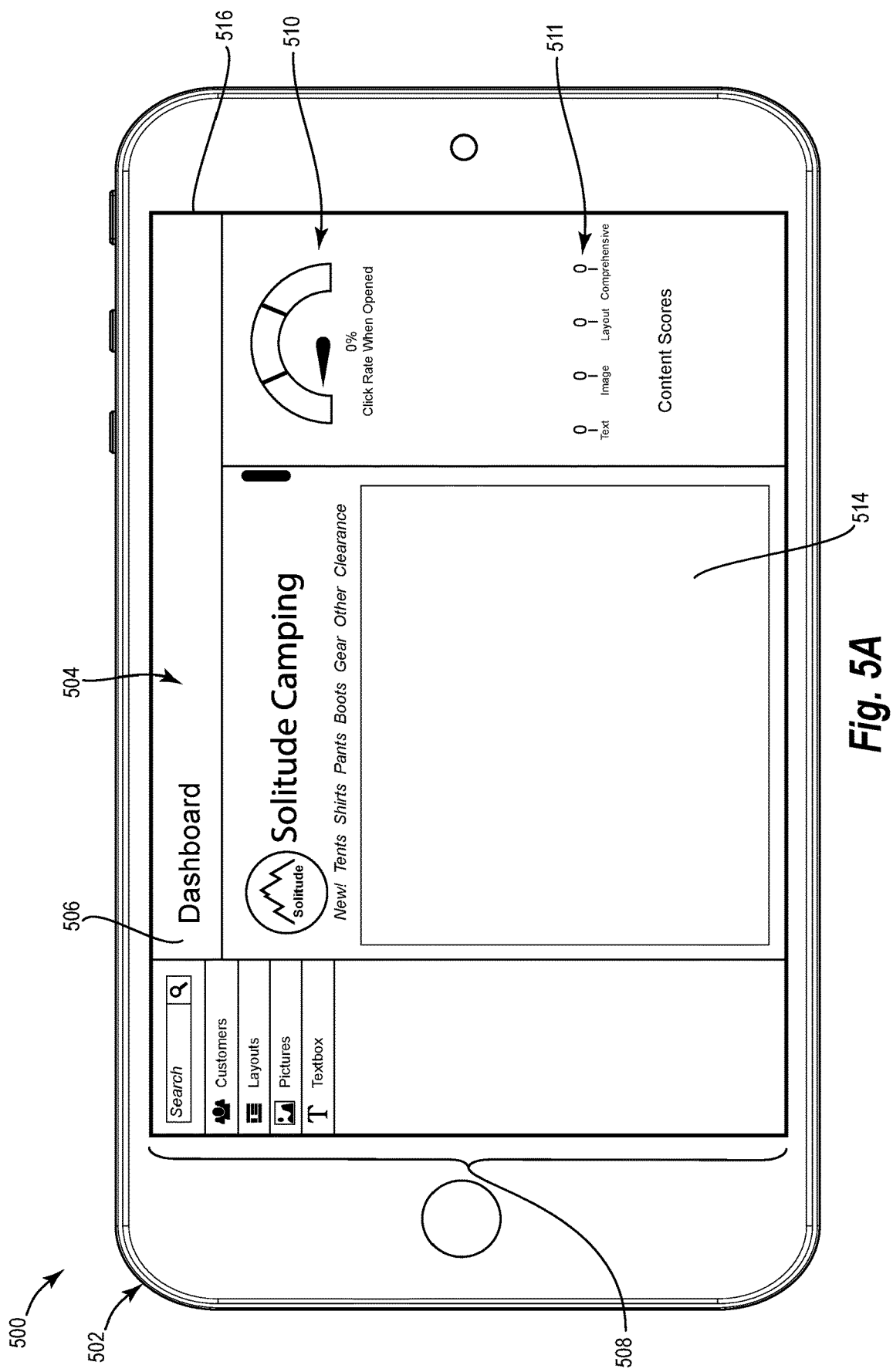
FIGS. 5A-5C illustrate example graphical user interfaces including features of the communication system of FIG. 1 according to one or more embodiments of the present disclosure.
Figure 5B:
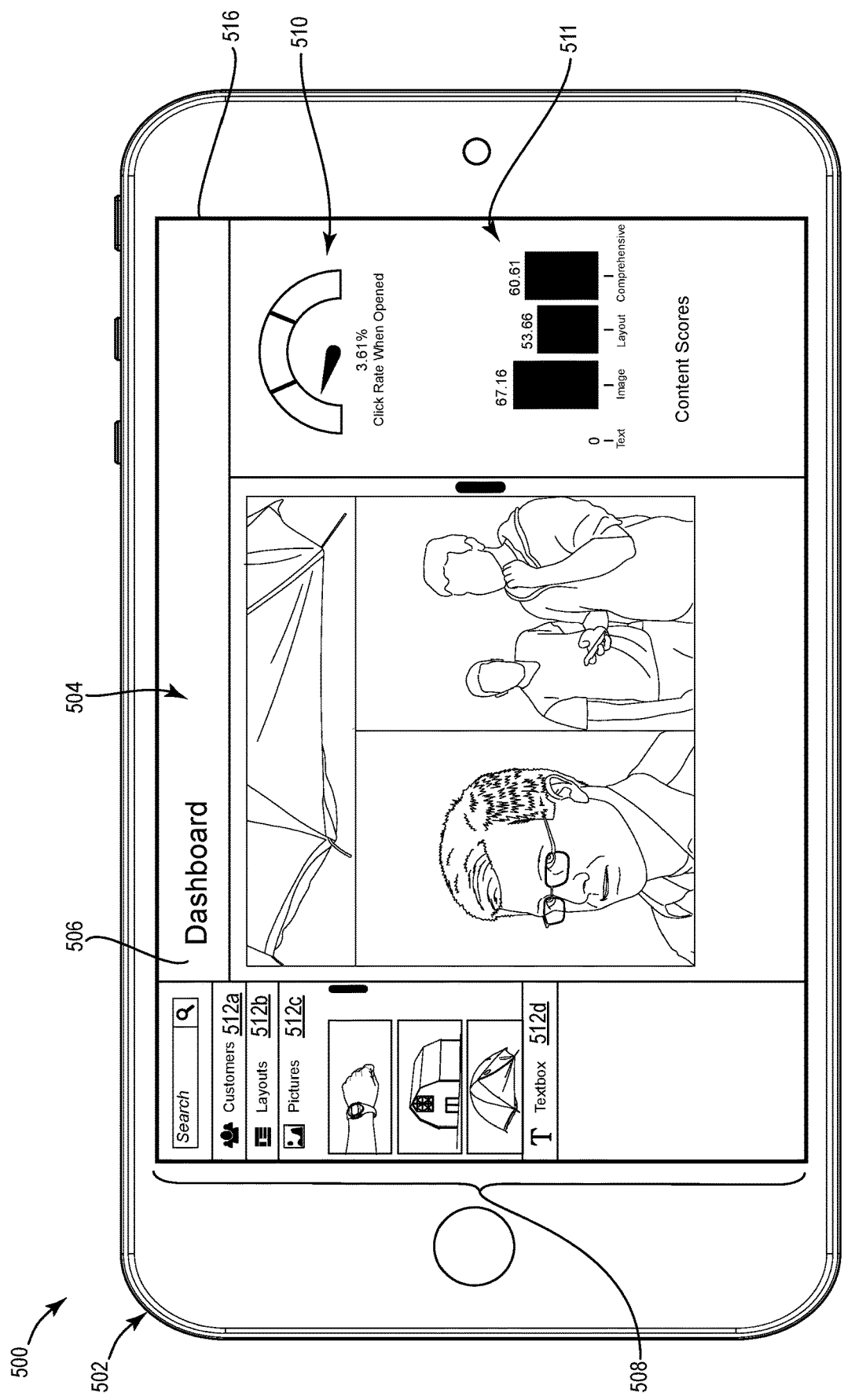
Figure 5C:
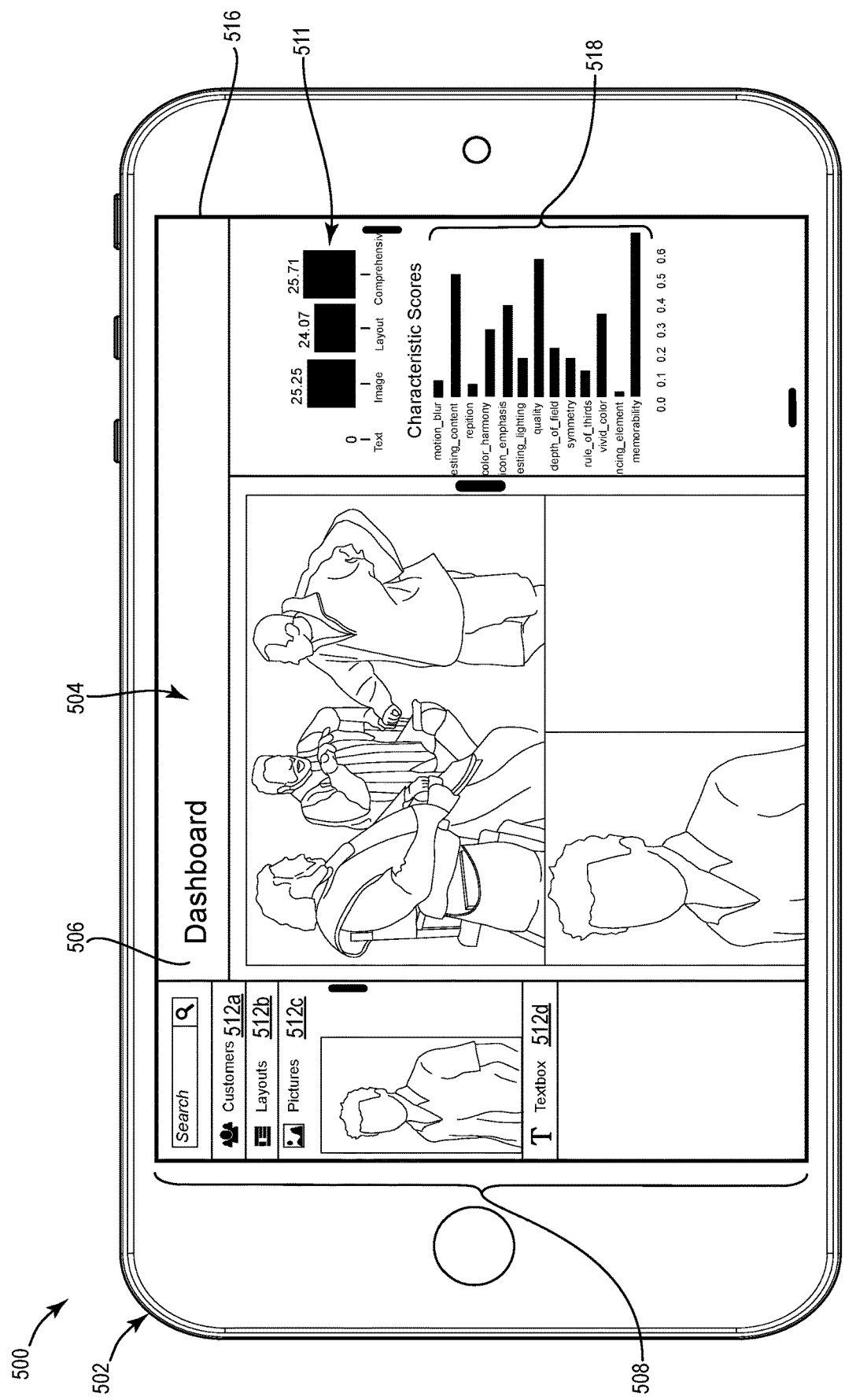

FIGS. 5A-5C illustrate a flow 500 of user interfaces including features of the communication system 100 according to an embodiment of the present disclosure. As will be described in more detail below, the components of the communication system 100 as described in regard to FIGS. 1-4 can provide, along and/or in combination with the other components, one or more graphical user interfaces ("GUIs"). In particular, the components can allow a user (e.g., the user 100 of FIG. 1) to interact with a collection of display elements for a variety of purposes. In particular, FIGS. 5A-5C and the description that follows illustrate various example embodiments of the user interfaces and features that are in accordance with one or more embodiments of the present disclosure.

For example, FIG. 5A illustrates a user device 502 of a content analysis system user (e.g., the user 110 of FIG. 1) that may implement one or more of the components or features of the communication system 100. As shown in FIG. 5A, in some embodiments, the user device 502 is a handheld device, such as a tablet device. As used herein, the term "handheld device" refers to a device sized and configured to be held/operated in one or more hands of the user 110. In additional or alternative examples, however, any other suitable computing device, such as, but not limited to, a mobile phone device, larger wireless device, laptop or desktop computer, a personal digital assistant device, and/or any other suitable computing device can perform one or more of the processes and/or operations described herein.

The user device 502 includes a touch screen display 516 that can display user interfaces. Furthermore, the user device 502 receives and/or detects user input via the touch screen display 516. As used herein, a "touch screen display" refers to the display of a touch screen device. In one or more embodiments, a touch screen device may be the user device 502 with at least one surface upon which a user may perform touch gestures (e.g., a laptop, a tablet computer, a personal digital assistant, a media player, a mobile phone, etc.). Additionally or alternatively, the user device 302 may include any other suitable input device, such as a touch pad or those described below with reference to FIG. 8.

As shown in FIG. 5A, the touch screen display 516 of the user device 502 displays a content analysis system graphical user interface ("GUI") 504 provided by the content analysis system 104, which, in some embodiments, may be installed on the user device 502. The content analysis system GUI 504 displays an analysis dashboard 506 (e.g., control GUI). The analysis dashboard 506 includes a toolbar 508, one or more score indicators 510, 511, and a preview window 512. Furthermore, the toolbar 508 includes a plurality of tabs 512a, 512b, 512c, 512d.

Referring to FIGS. 5A and 5B together, in response to user interactions with the dashboard 506, the content analysis system 104 determines the persuasion score and/or predicted click-through rate of a content item. For example, in response to detecting user interactions adding (e.g., dragging, pasting, inserting) elements (e.g., textual elements, image elements, and/or layout elements) into the preview window 512, the content analysis system 104 determines and displays one or more of the persuasion score and predicted click-through rate of a content item formed by the added elements. For example, the content analysis system 104 determines the persuasion score and predicted click-through rate of the content item through any of the methods described above in regard to FIGS. 2-4. Furthermore, in some embodiments, the content analysis system 104 displays the persuasion score and/or predicted click-through rate of the content item via the score indicators 510, 511. Moreover, as illustrated in FIG. 5B, in some embodiments, the content analysis system 104 displays a persuasion score of each of the textual element, the image element, and the layout element of the content item.

Upon having elements added thereto, the preview window 512 provides a preview (e.g., an advance sample) of the content. Furthermore, the preview window 512 permits the elements within the preview window 512 to be manipulated while within the preview window 512. Moreover, the content analysis system 104 can continuously determine the persuasion score and/or predicted click-through rate of the content item while the content item within the preview window 512 is being manipulated. In other words, after every change to the content item, the dashboard 506 of the content analysis system 104 determines and displays the persuasion score and/or predicted click-through rate of the current content item.

In some embodiments, the plurality of tabs 512a, 512b, 512c, 512d of the toolbar 508 enables a user to add elements to and/or adjust the elements within the preview window 512. In particular, as shown in FIGS. 5B and 5C, in response to detecting a user interaction with a tab of the plurality of tabs 512a, 512b, 512c, 512d, the content analysis system 104 causes the dashboard 506 to display, e.g., via a drop down menu, one or more images, layouts, and/or text boxes that are available to the user for use within a content item. Furthermore, upon detecting a user interaction with (e.g., detecting a user interaction clicking on and/or dragging) the available images, layouts, and/or text boxes, the content analysis system 104 adds the selected images, layouts, and/or text boxes to the preview window 512.

In additional embodiments, the dashboard 506 and content analysis system 104 enables a user to add elements (e.g., textual elements, image elements, and/or layout elements) to the preview window 514 from other sources (e.g., other systems and/or application, image files, web browsers, etc.). For example, the dashboard 506 and content analysis system 104 can enable a user to add an element to the preview window 514 from other sources by copying and pasting the element into the preview window 514, uploading the element, inserting the element (e.g., inserting the element via an insert functions), dragging the element from other sources, etc.

In addition to determining and displaying persuasion scores of the elements of the content item (FIG. 5B), in some embodiments, the content analysis system 104 determines and displays the scores 518 of the characteristics of the elements, as shown in FIG. 5C. For example, the content analysis system 104 determines the scores 518 of the characteristics of the elements through any of the methods described above in regard to acts 206-214 of FIG. 2.

Figure 6:
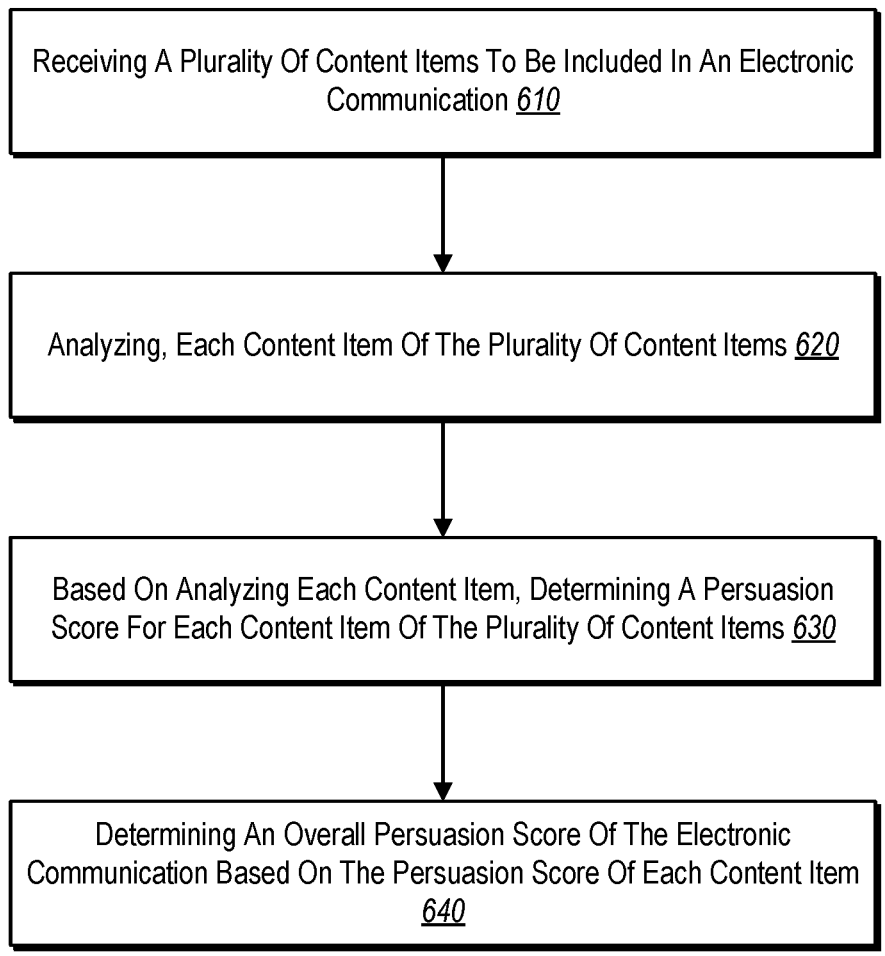
FIG. 6 shows a flowchart of an example method for determining a persuasiveness of an email in accordance with one or more embodiments of the present disclosure.
Figure 7:
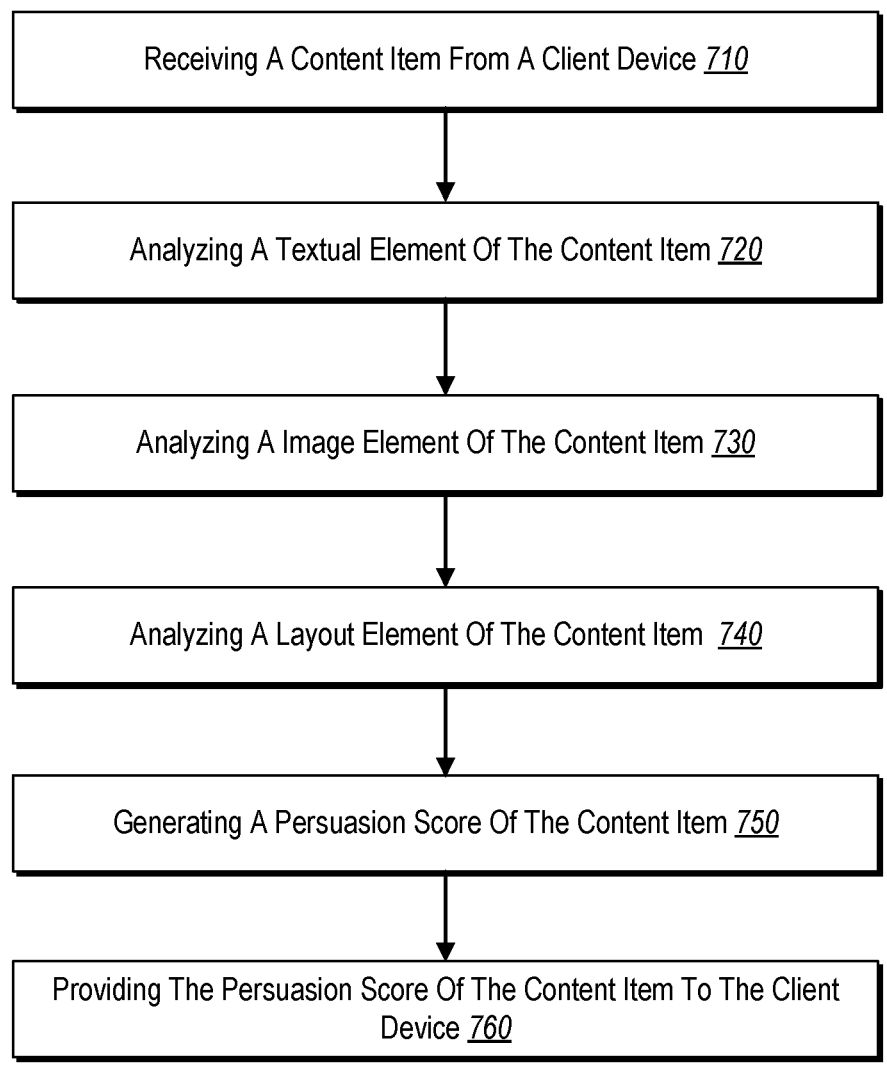
FIG. 7 shows a flowchart of another example method for determining a persuasiveness of a content item in accordance with one or more embodiments of the present disclosure.

FIGS. 6-7 illustrate a flowchart of a series of acts in a method of determining the persuasiveness of a content item in accordance with one or more embodiments of the content analysis system 104. While FIGS. 6-7 illustrate acts according to one embodiment, alternative embodiments may omit, add to, reorder, and/or modify any of the acts shown in FIGS. 6-7. Further, to perform the one or more acts of a method, the content analysis system 104 includes computer-executable instructions that, when executed by at least one processor of the server device(s) 103, cause the server device(s) 103 of the content analysis system 104 to perform the acts shown in FIGS. 6-7.

FIG. 6 illustrates a flowchart of another example method 600 for determining the persuasiveness of a user-authored digital content item. The method 600 can be implemented by the content analysis system 104 described above. The method 600 involves an act 610 of receiving a content item. For example, act 610 can include receiving an electronic communication comprising a plurality of content items from a client device. Moreover, the act 610 may include any of the actions described above in regard to step 202 of FIG. 2.

The method 600 may further include an act 620 of analyzing a content item of the electronic communication. Specifically, act 620 can include analyzing, by at least one processor, each content item of the plurality of content items within the electronic communication.

Additionally, the method 600 includes an act 630 of determining a persuasion score of each content item of the electronic communication. In particular, the act 630 may include, based on analyzing each content item, determining a persuasion score for each content item of the plurality of content items within the electronic communication. Additionally, the act 630 may include any of the actions described above in regard to steps 208-214 of FIG. 2.

Moreover, the method 600 includes an act 640 of determining an overall persuasion score of the electronic communication. For example, the act 640 may include determining an overall persuasion score of the electronic communication based on the persuasion score of each content item of the plurality of content items. For instance, the act 640 can include combining each weighted persuasion score for each content item of the plurality of content items. Additionally, the act 640 may include any of the actions described above in regard to steps 208-214 of FIG. 2.

The method 600 can also involve an act of determining a proportion of an area within the electronic communication that corresponds to each content item of the plurality of content items within the electronic communication and an act of generating a weighted persuasion score for each content item of the plurality of content items, wherein the weighted persuasion score is based on the proportion of the display area that corresponds to each content item. Furthermore, method 600 can include an act of providing, for presentation on the client device, an indication of an element of the content item that are reducing the persuasion score, an act of receiving an updated electronic communication, wherein the element of the content item is modified within the updated electronic communication, and an act of sending the updated electronic communication to a plurality of recipient users. Additionally, the method 600 can include any of the actions described above in regard to FIG. 2.

FIG. 7 illustrates a flowchart of an example method 700 for determining the persuasiveness of a digital media item. The method 700 can be implemented by the content analysis system 104 described above. The method 700 involves an act 710 of receiving a content item. For example, act 710 can include receiving a content item from a client device. In some embodiments, receiving a content item includes receiving an electronic communication having a plurality of content items. Moreover, the act 710 may include any of the actions described above in regard to step 202 of FIG. 2.

Additionally, the method 700 involves an act 720 of analyzing textual elements of the content item. For example, act 720 can include analyzing a textual element of the content item to determine a first characteristic score corresponding to the at least one textual element of the content item. In particular, the act 720 may include determining a text readability, a text formality, or a text sentiment of the textual element. Additionally, the act 720 may include any of the actions described above in regard to step 206 of FIG. 2.

Also, the method 700 can include act 730 of analyzing image elements of the content item. In particular, act 730 can include analyzing an image element of the content item to determine a second characteristic score corresponding to the image element of the content item. In some embodiments, act 730 can include determining an image memorability or an image aesthetic of the image element. Moreover, act 730 can include analyzing one or more of an image organization, object repetition, a depth of field, a lighting, a symmetry, a color scheme, motion blur, an object emphasis, and a color harmony of the at least one image element of the content item. Additionally, the act 730 may include any of the actions described above in regard to step 206 of FIG. 2.

Likewise, method 700 can include act 740 of analyzing layout elements of the content item. For example, act 740 can include analyzing a layout element of the content item to determine a third characteristic score corresponding to the layout element of the content item. Furthermore, act 740 can include determining a proportion of an area corresponding to the image element with respect to a total area of the content item and/or analyzing a position of the at least one image element within the content item. Additionally, the act 740 may include any of the actions described above in regard to step 206 of FIG. 2.

The method 700 also involves an act 750 of generating a persuasion score of the content item. The comprehensive persuasion score is based on first characteristic score, the second characteristic score, and the third characteristic score. Furthermore, the act 750 may include generating the comprehensive persuasion score of the content item using a machine learning model. Additionally, the act 750 may include any of the actions described above in regard to steps 208-214 of FIG. 2.

Moreover, the method 700 involves an act 760 of providing the persuasion score. For example, act 760 can include providing the persuasion score of the content item to the client device. Additionally, the act 760 may include any of the actions described above in regard to step 220 of FIG. 2.

Furthermore, the method 700 can involve identifying a set of intended recipients of the content item. Moreover, method 700 can also include analyzing characteristics associated with each intended recipient within the set of intended recipients to determine a fourth characteristic score corresponding to each intended recipient. In some instances, generating the persuasion score utilizes the fourth characteristic score corresponding to each intended recipient. Also, the method 700 can include analyzing characteristics associated with each intended recipient of the content item to determine a fourth characteristic score comprises determining at least one of a gender of the intended recipient, an income level of the intended recipient, a time since a last interaction with a previous content item by the intended recipient, or a time since a registration of the intended recipient. Additionally, the method 700 can include any of the actions described above in regard to FIGS. 2-5C.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
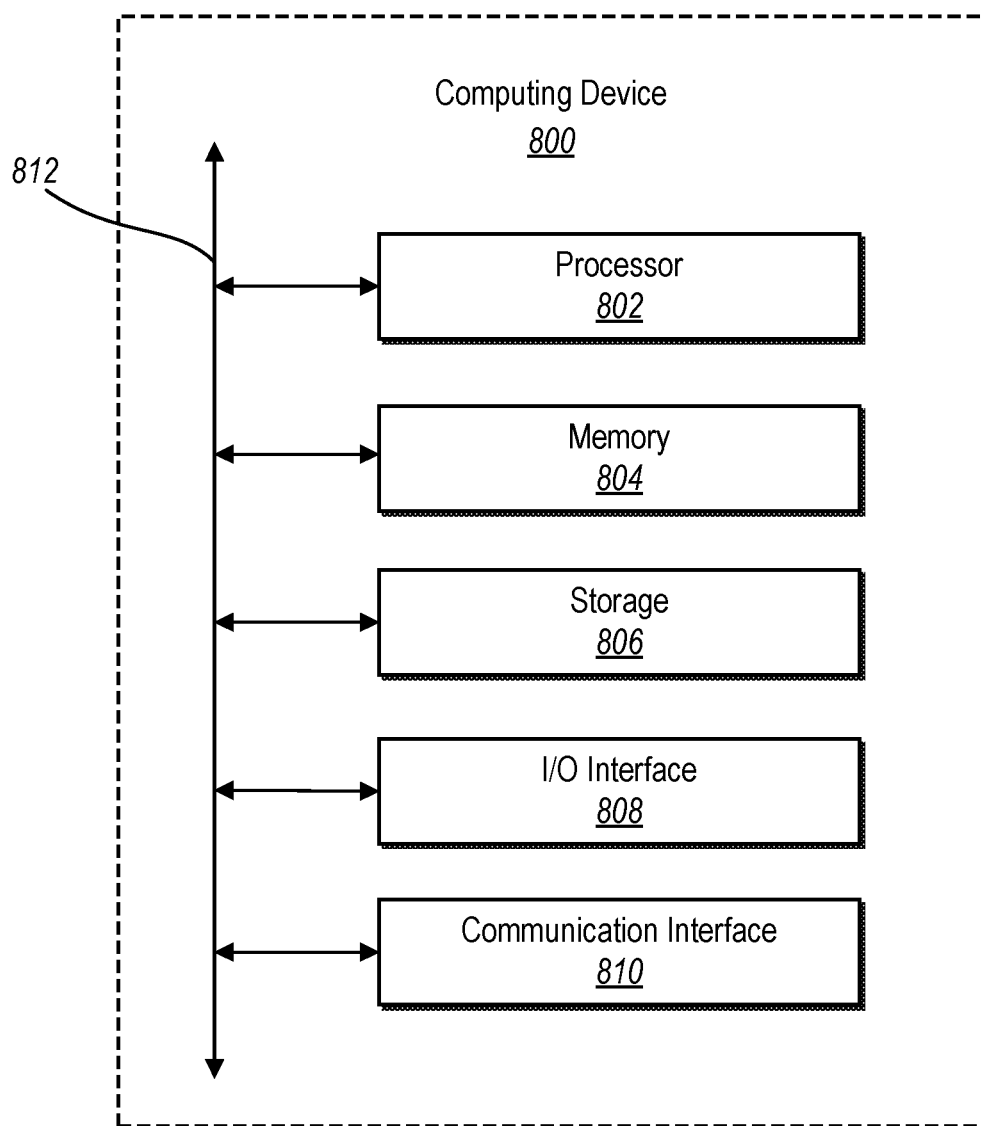
FIG. 8 illustrates a block diagram of an example computing device in accordance with one or more embodiments of the present disclosure.

FIG. 8 illustrates a block diagram of an example computing device 800 that may be configured to perform one or more of the processes described above. One will appreciate that one or more computing devices such as the computing device 800 may implement the media system 108 and/or client device 102. As shown by FIG. 8, the computing device 800 can comprise a processor 802, a memory 804, a storage device 806, an I/O interface 808, and a communication interface 810, which may be communicatively coupled by way of a communication infrastructure 812. While an example computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation look aside buffers (TLBs). Instructions in the instruction caches may be copies of instructions in the memory 804 or the storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 that includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to, receive output from, and otherwise transfer data to and receive data from computing device 800. The I/O devices/interfaces 808 may include a mouse, a keypad or a keyboard, a touch screen, a camera, an optical scanner, network 108 interface, modem, other known I/O devices or a combination of such I/O device/interfaces. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

We claim:

1. A method of determining persuasiveness of a user-authored digital content item, the method comprising:
   receiving a content item from a client device of a user;
   analyzing, by at least one processor, the content item, wherein analyzing the content item comprises:
      generating, utilizing a natural language processing model, a first characteristic score corresponding to a textual element of the content item based on an analysis of one or more textual element factors by the natural language processing model;
      generating, utilizing a digital image processing model, a second characteristic score corresponding to an image element of the content item based on an analysis of one or more image element factors by the digital image processing model; and
      generating, utilizing the digital image processing model, a third characteristic score corresponding to a layout element of the content item based on an analysis of one or more layout element factors by the digital image processing model;
   determining a persuasion score of the content item, the persuasion score comprising a combination of the first characteristic score, the second characteristic score, and the third characteristic score;
   based on the persuasion score of the content item, determining a probability click-through rate for the content item with respect to an intended audience; and
   providing the probability click-through rate for the content item for display on the client device of the user.

2. The method of claim 1, further comprising:
   identifying a set of intended recipients of the content item, the intended audience comprising the set of intended recipients; and
   analyzing characteristics associated with each intended recipient within the set of intended recipients to determine a fourth characteristic score corresponding to each intended recipient, wherein the persuasion score of the content item further comprises the fourth characteristic score corresponding to each intended recipient.

3. The method of claim 2, wherein analyzing the characteristics associated with each intended recipient of the content item to determine the fourth characteristic score comprises determining at least one of a gender of the intended recipient, an income level of the intended recipient, a time since a last interaction with a previous content item by the intended recipient, or a time since a registration of the intended recipient.

4. The method of claim 1, wherein the one or more text element factors comprises textual element factors associated with a text readability, a text formality, or a text sentiment of the textual element.

5. The method of claim 1, wherein the one or more image element factors comprises image element factors associated with an image memorability or an image aesthetic of the image element.

6. The method of claim 1, wherein the one or more layout element factors comprises image layout factors associated with a proportion of an area corresponding to the image element with respect to a total area of the content item.

7. A system comprising:
   a memory comprising a database of potential recipients of a content item, wherein the database of potential recipients comprises attribute information associated with each potential recipient of the potential recipients; and
   a computer device communicatively coupled to the memory, the computer device storing instructions that, when executed by at least one processor, cause the computer device to:
      access the database of potential recipients for the content item;
      determine, utilizing one or more machine learning models, a plurality of element characteristic scores for the content item based on an analysis of a plurality of element factors associated with elements of the content item by the one or more machine learning models;

determine a plurality of recipient characteristic scores for each intended recipient within a set of intended recipients by analyzing subject matter of the content item and the attribute information associated with each intended recipient within the database of potential recipients;

determine persuasion scores for the set of intended recipients, the persuasion scores comprising a combination of the plurality of element characteristic scores and the plurality of recipient characteristic scores for each intended recipient, wherein a given persuasion score relates to a given intended recipient from the set of intended recipients; and based on the persuasion scores over all intended recipients within the set of intended recipients, determine a probability click-through rate for the content item.

8. The system of claim 7, further comprising instructions that, when executed by the at least one processor, cause the computer device to analyze the content item to identify the elements of the content item.

9. The system of claim 7, further comprising instructions that, when executed by the at least one processor, cause the computer device to identify the set of intended recipients from the database of potential recipients.

10. The system of claim 7, wherein the instructions, when executed by the at least one processor, causes the computer device to determine the persuasion scores for the set of intended recipients by using the plurality of element characteristic scores and the plurality of recipient characteristic scores by:

assigning a weight determined by a machine learning model to each element characteristic score of the plurality of element characteristic scores to obtain a plurality of weighted element characteristic scores;

assigning a weight determined by the machine learning model to each recipient characteristic score of the plurality of recipient characteristic scores to obtain a plurality of weighted recipient characteristic scores; and combining the plurality of weighted element characteristic scores and the plurality of weighted recipient characteristic scores to determine the persuasion scores for the set of intended recipients.

11. The system of claim 10, further comprising instructions that, when executed by the at least one processor, cause the computer device to perform a probability correction adjustment using a correction factor to determine an interaction probability for each intended recipient of the set of intended recipients.

12. The system of claim 11, wherein the probability click-through rate for the content item represents a predicted interaction rate of the content item for the set of intended recipients.

13. A method of determining persuasiveness of a user-authored digital content item, the method comprising:

receiving an electronic communication comprising a plurality of content items;

generating, by at least one processor and utilizing one or more machine learning models, a plurality of element characteristic scores for each content item of the plurality of content items within the electronic communication based on an analysis of a plurality of element factors associated with elements of each content item by the one or more machine learning models;

determining a persuasion score for each content item of the plurality of content items within the electronic communication, the persuasion score for each content item comprising a combination of the plurality of element characteristic scores for each content item;

determining an overall persuasion score of the electronic communication based on the persuasion score for each content item of the plurality of content items; and based on the overall persuasion score for the electronic communication, determining a probability click-through rate for the electronic communication with respect to an intended audience.

14. The method of claim 13, further comprising:

determining a proportion of an area within the electronic communication that corresponds to each content item of the plurality of content items within the electronic communication; and generating a weighted persuasion score for each content item of the plurality of content items, wherein the weighted persuasion score is based on the persuasion score for each content item and the proportion of the area that corresponds to each content item.

15. The method of claim 14, wherein determining the overall persuasion score of the electronic communication comprises combining the weighted persuasion score for each content item of the plurality of content items.

16. The method of claim 15, further comprising:

providing, for presentation, an indication of an element of a content item of the plurality of content items that is reducing the overall persuasion score of the electronic communication;

receiving an updated electronic communication, wherein the element of the content item is modified within the updated electronic communication; and sending the updated electronic communication to a plurality of recipient users.

17. The method of claim 13, further comprising providing, for display on a client device associated with an author of the electronic communication, the probability click-through rate for the electronic communication at a time of authoring the electronic communication.

18. The method of claim 17, wherein providing the probability click-through rate for the electronic communication for display on the client device comprises providing the probability click-through rate via a user interface displayed on the client device; and further comprising:

detecting, via the user interface, a user interaction adding an element to the electronic communication, the element comprising a textual element, an image element, or a layout element; and in response to detecting the user interaction adding the element to the electronic communication, providing, for display via the user interface, an updated click-through rate for the electronic communication with the element.

19. The method of claim 13, further comprising:

identifying an element of a content item of the electronic communication that is reducing the persuasion score of the electronic communication, the element comprising a textual element, an image element, or a layout element; and providing, for display on a client device, an indication of the element that is reducing the persuasion score of the electronic communication.

20. The method of claim 19, further comprising, in response to providing the indication of the element that is reducing the persuasion score of the electronic communication, receiving a modified content item comprising a modification to the element.

\* \* \* \* \*